United States Patent
Zhang et al.

(10) Patent No.: US 11,277,759 B2
(45) Date of Patent: Mar. 15, 2022

(54) METHOD AND DEVICE FOR TRANSMITTING SIGNAL, AND STORAGE MEDIUM

(71) Applicant: XI'AN ZHONGXING NEW SOFTWARE CO., LTD, Shaanxi (CN)

(72) Inventors: Shujuan Zhang, Shenzhen (CN); Zhaohua Lu, Shenzhen (CN); Yuhong Gong, Shenzhen (CN); Chuangxin Jiang, Shenzhen (CN); Xiaopeng Wang, Shenzhen (CN); Meng Mei, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 240 days.

(21) Appl. No.: 16/338,342

(22) PCT Filed: Nov. 4, 2016

(86) PCT No.: PCT/CN2016/104792
§ 371 (c)(1),
(2) Date: Dec. 30, 2019

(87) PCT Pub. No.: WO2018/058745
PCT Pub. Date: Apr. 5, 2018

(65) Prior Publication Data
US 2020/0137598 A1 Apr. 30, 2020

(30) Foreign Application Priority Data
Sep. 30, 2016 (CN) .......................... 201610877938.0

(51) Int. Cl.
*H04W 24/10* (2009.01)
*H04L 5/00* (2006.01)
(Continued)

(52) U.S. Cl.
CPC .......... *H04W 24/10* (2013.01); *H04L 5/0051* (2013.01); *H04W 72/042* (2013.01);
(Continued)

(58) Field of Classification Search
CPC ............... H04W 24/10; H04W 72/042; H04W 72/0446; H04W 72/0453; H04W 72/1273;
(Continued)

(56) References Cited

U.S. PATENT DOCUMENTS

2017/0201968 A1* 7/2017 Nam .................. H04L 5/0048
2018/0049203 A1* 2/2018 Xue .................... H04L 5/0053

FOREIGN PATENT DOCUMENTS

CN 102469589 A 5/2012
CN 103095442 A 5/2013
(Continued)

OTHER PUBLICATIONS

Ericsson, "Dynamic CSI framework" R1-167461, Aug. 26, 2016 (Aug. 26, 2016), Section 2, Göteborg, Sweden, 6 pages.
(Continued)

*Primary Examiner* — Dady Chery
(74) *Attorney, Agent, or Firm* — Cantor Colburn LLP

(57) ABSTRACT

The present disclosure relates to a method and device for receiving a measurement reference signal. The method includes: receiving control signaling; and receiving the measurement reference signal according to the control signaling; wherein the first set of time domain symbols comprise M symbols, where M is a natural number; the measurement reference signal is in a measurement reference signal resource, and the measurement reference signal resource comprises at least one measurement reference signal port; wherein the start time domain symbol set comprises time domain symbols with index number 0 to
(Continued)

index number A in the second time unit, wherein A is a non-negative integer which is smaller than or equal to 3.

19 Claims, 13 Drawing Sheets

(51) Int. Cl.
*H04W 72/04* (2009.01)
*H04W 72/12* (2009.01)

(52) U.S. Cl.
CPC ... *H04W 72/0446* (2013.01); *H04W 72/0453* (2013.01); *H04W 72/1273* (2013.01)

(58) Field of Classification Search
CPC ............ H04W 72/0413; H04L 5/0051; H04L 5/0023; H04L 5/0048; H04L 5/0053
See application file for complete search history.

(56) References Cited

FOREIGN PATENT DOCUMENTS

| WO | 2013064107 A1 | 5/2013 |
|---|---|---|
| WO | 2016114628 A1 | 7/2016 |

OTHER PUBLICATIONS

International Search Report for International Application No. PCT/CN2017/104792; Date of Completion: Apr. 17, 2017; dated May 22, 2017; 2 pages.
Mediatec Inc., "Control Channel Design for latency reduction" R1-165123, May 27, 2016 (May 27, 2016), Section 2, Nanjing, China, 4 pages.
Chinese Office Action for corresponding application 201610877938.0; dated Dec. 28, 2021.
Chinese Search Report for corresponding application 201610877938.0; dated Dec. 20, 2021.

* cited by examiner

METHOD AND DEVICE FOR TRANSMITTING SIGNAL, AND STORAGE MEDIUM

CROSS REFERENCE

The present application is a continuing application of International Application No. PCT/CN2016/104792, filed on Nov. 4, 2016, which is based upon and claims priority to Chinese Patent Application No. 201610877938.0, filed on Sep. 30, 2016, and the entire contents thereof are incorporated herein by reference.

TECHNICAL FIELD

The present disclosure relates to the field of communication technology, and in particular to a method and a device for transmitting a signal, and a storage medium.

BACKGROUND

The fifth generation mobile communication system—the new generation wireless technology (5G-NR) tends to support non-periodic measurement signals, and it is desirable to complete trigger signaling of a measurement reference signal, transmission of the measurement reference signal, and feedback information based on the measurement reference signal in a time period as short as possible, even in the same time unit. In this case, an overhead of triggering signaling becomes a problem.

Since high-frequency communication is core technical means for 5G-NR communication, the above measurement process requires further consideration of high-frequency communication. The distinguishing feature of high-frequency communication is beam-based transmission, and considering the cost problem, the high-frequency communication tends to be based on on hybrid beam transmission. That is, in this case, the radio frequency also has a beam direction, instead of covering the whole cell by the radio frequency beam. However, since one radio frequency link can only emit one radio frequency beam in an Orthogonal Frequency Division Multiplexing (OFDM) symbol, when the measurement reference signal conflict with the radio frequency beam corresponding to the data in the same time unit, on the one hand, it is necessary to consider transmitting the measurement reference signal and the control signaling corresponding to the data through a time-division resource when the control channel is used for transmission, and on the other hand, it is necessary to consider how to multiplex the measurement of the corresponding control signaling and the measurement reference signal. Thus, how to improve resource utilization while reducing complexity of a base station is the problem that needs to be solved now.

SUMMARY

In order to solve the above technical problem, embodiments of the present disclosure provide a method and an apparatus for transmitting a signal, and a storage medium.

An embodiment of the present disclosure provides a method for transmitting a signal, including:
configuring a measurement reference signal to occupy a frequency domain resource in a first set of time domain symbols where a control channel is located; and transmitting configuration information of the measurement reference signal through control signaling; and/or transmitting the control channel in a second set of time domain symbols where the measurement reference signal is located; and/or
transmitting configuration information of the measurement reference signal through control signaling, wherein in the configuration information of the measurement reference signal, a range of indices of time domain symbols occupied by the measurement reference signal includes one or more start time domain symbols in a second time unit, where the second time unit is a time unit for transmitting the measurement reference signal; and
wherein the set of time domain symbols includes M symbols, where M is a natural number; the measurement reference signal is a measurement reference signal port or a measurement reference signal resource, and the measurement reference signal resource includes at least one measurement reference signal port.

In the solution, the configuration information includes at least one of the following information:
an index of a time domain symbol occupied by the measurement reference signal in the first set of time domain symbols, an index of a frequency domain block of the measurement reference signal in the time domain symbol; information indicating whether to transmit the measurement reference signal; information indicating a transmission pattern of the measurement reference signal in the frequency domain block; information indicating whether to report channel state information CSI and information indicating whether to report the time-frequency resource where the CSI is located; configuration information of the first set of time domain symbols; and configuration information of the second set of time domain symbols, and
one symbol includes MF frequency domain blocks, where MF is an integer greater than one.

In the solution, at least one of the following information of the measurement reference signal is set with a receiving end: an index of a symbol occupied by the measurement reference signal in the first set of time domain symbols, an index of a frequency domain block of the measurement reference signal in the time domain symbol; information indicating whether to transmit the measurement reference signal; information indicating a transmission pattern of the measurement reference signal in the frequency domain block; and information indicating whether to report CSI and information indicating whether to report the time-frequency resource where the CSI is located.

In the solution, in a time domain symbol, the control channel and the measurement reference signal are frequency division multiplexed.

In the solution, the frequency division multiplexing satisfies at least one of the following features:
frequency division multiplexing of a combed structure is employed;
a number of the frequency domain blocks occupied by the control channel is greater than a number of the frequency domain blocks occupied by the measurement reference signal;
an index set of the frequency domain blocks that can be occupied by the measurement reference signal is a subset of an index set of the frequency domain blocks that can be occupied by the control channel;
the index set of the frequency domain blocks that can be occupied by the control channel includes all of the frequency domain blocks in the symbol; and the index set of the frequency domain blocks occupied by the control channel and the index set of the frequency domain block occupied by the measurement reference signal are set with the receiving end.

In the solution, the frequency domain block of the measurement reference signal in one symbol is larger than the frequency domain block corresponding to the control channel; and the frequency domain block of the measurement reference signal in one symbol includes a frequency domain block corresponding to NF control channels, where NF is an integer greater than 1.

In the solution, the configuration information satisfies at least one of the following features:

one measurement reference signal port occupies a resource in NR symbols in the first set of time domain symbols, 1≤NR≤M;

one measurement reference signal resource occupies a resource in NR1 symbols in the first set of time domain symbols, 1≤NR1≤M;

the control channel occupies MC symbols in the second set of time domain symbols in which the measurement reference signal is located, 1≤MC≤MCT, where the set of time domain symbols in which the measurement reference signal is located includes MCT time domain symbols;

the one measurement reference signal resource occupies a resource in the first set of time domain symbols, and does not occupy a resource outside the first set of time domain symbols;

the one measurement reference signal port occupies a part of the frequency domain block resource in the time domain symbol; and the control signaling is transmitted in the control channel.

In the solution, NR is 1 and NR1 is 1.

In the solution, one measurement reference signal resource occupies resources in the first set of time domain symbols and a resource outside the first set of time domain symbols; and one measurement reference signal port occupies resources in the first set of time domain symbols and a resource outside the first set of time domain symbols.

In the solution, the second set of time domain symbols satisfies at least one of the following features:

the second set of time domain symbols is at an end position of a downlink transmission domain of a first time unit;

x time domain symbols are between a start symbol of the second set of time domain symbols and a start position of the first time unit, where x is a natural number greater than 0; and the time domain symbols in the second set of time domain symbols are consecutive; and the first time unit is a time unit where the second set of time domain symbols is located.

In the solution, the first set of time domain symbols and/or the second set of time domain symbols appear in a set time unit, and the measurement reference signal cannot be transmitted on the first set of time domain symbols in an unset time unit, and/or the control channel cannot be transmitted on the second set of time domain symbols in an unset time unit; and the index of the set time unit is sent to the receiving end by signaling.

In the solution, in the configuration information of the measurement reference signal, the index range of the time domain symbols occupied by the measurement reference signal includes one or more start time domain symbols of the second time unit;

the second time unit is a time unit for transmitting the measurement reference signal; and the set of time domain symbols occupied by the control channel in the second set of time domain symbols is a subset of the second set of time domain symbols.

In the solution, the control channel satisfies at least one of the following features:

a minimum mapping unit of the control channel is a comb-shaped frequency domain block in the one symbol; and a minimum mapping unit of the control channel is a subcarrier group in a comb-shaped frequency domain block in the one symbol, wherein one comb-shaped frequency domain block includes more than one subcarrier group.

In the solution, one time domain symbol is one OFDM symbol;

the control channel is a downlink control channel;

the time unit is one subframe; and the control signaling is proprietary control signaling.

An embodiment of the present disclosure also provides an apparatus for transmitting a signal, including:

a configuring unit configured to configure a measurement reference signal to occupy a frequency domain resource in a first set of time domain symbols where a control channel is located; and a transmitting unit configured to transmit configuration information of the measurement reference signal through control signaling; and/or transmit the control channel in a second set of time domain symbols where the measurement reference signal is located; and/or transmit configuration information of the measurement reference signal through control signaling, wherein in the configuration information of the measurement reference signal, a range of indices of time domain symbols occupied by the measurement reference signal includes one or more start time domain symbols in a second time unit, where the second time unit is a time unit for transmitting the measurement reference signal; and the set of time domain symbols includes M symbols, where M is a natural number; the measurement reference signal is a measurement reference signal port or a measurement reference signal resource, and the measurement reference signal resource includes at least one measurement reference signal port.

In the solution, the configuration information includes at least one of the following information:

an index of a time domain symbol occupied by the measurement reference signal in the first set of time domain symbols, an index of a frequency domain block of the measurement reference signal in the time domain symbol; information indicating whether to transmit the measurement reference signal; information indicating a transmission pattern of the measurement reference signal in the frequency domain block; information indicating whether to report channel state information CSI and to report the time-frequency resource where the CSI is located; configuration information of the first set of time domain symbols; and configuration information of the second set of time domain symbols, and one symbol includes MF frequency domain blocks, where MF is an integer greater than one.

In the solution, at least one of the following information of the measurement reference signal is set with a receiving end: an index of a symbol occupied by the measurement reference signal in the first set of time domain symbols, an index of a frequency domain block of the measurement reference signal in the time domain symbol; information indicating whether to transmit the measurement reference signal; information indicating a transmission pattern of the measurement reference signal in the frequency domain block; and information indicating whether to report CSI and to report the time-frequency resource where the CSI is located.

In the solution, in a time domain symbol, the control channel and the measurement reference signal are frequency division multiplexed.

In the solution, the frequency division multiplexing satisfies at least one of the following features:
  frequency division multiplexing of a combed structure is employed;
  a number of the frequency domain blocks occupied by the control channel is greater than a number of the frequency domain blocks occupied by the measurement reference signal;
  an index set of the frequency domain blocks that can be occupied by the measurement reference signal is a subset of an index set of the frequency domain blocks that can be occupied by the control channel;
  the index set of the frequency domain blocks that can be occupied by the control channel includes all of the frequency domain blocks in the symbol; and
  the index set of the frequency domain blocks occupied by the control channel and the index set of the frequency domain block occupied by the measurement reference signal are set with the receiving end.

In the solution, the frequency domain block of the measurement reference signal in one symbol is larger than the frequency domain block corresponding to the control channel; and
  the frequency domain block of the measurement reference signal in one symbol includes a frequency domain block corresponding to NF control channels, where NF is an integer greater than 1.

In the solution, the configuration information satisfies at least one of the following features:
  one measurement reference signal port occupies a resource in NR symbols in the first set of time domain symbols, 1≤NR≤M;
  one measurement reference signal resource occupies a resource in NR1 symbols in the first set of time domain symbols, 1≤NR1≤M;
  the control channel occupies MC symbols in the second set of time domain symbols in which the measurement reference signal is located, 1≤MC≤MCT, where the set of time domain symbols in which the measurement reference signal is located includes MCT time domain symbols;
  the one measurement reference signal resource occupies a resource in the first set of time domain symbols, and does not occupy a resource outside the first set of time domain symbols;
  the one measurement reference signal port occupies a part of the frequency domain block resource in the time domain symbol; and
  the control signaling is transmitted in the control channel.

In the solution, NR is 1 and NR1 is 1.

In the solution, one measurement reference signal resource occupies resources in the first set of time domain symbols and a resource outside the first set of time domain symbols; and
  one measurement reference signal port occupies resources in the first set of time domain symbols and a resource outside the first set of time domain symbols.

In the solution, the second set of time domain symbols satisfies at least one of the following features:
  the second set of time domain symbols is at an end position of a downlink transmission domain of a first time unit;
  x time domain symbols are between a start symbol of the second set of time domain symbols and a start position of the first time unit, where x is a natural number greater than 0; and
  the time domain symbols in the second set of time domain symbols are consecutive; and
  the first time unit is a time unit where the second set of time domain symbols is located.

In the solution, the first set of time domain symbols and/or the second set of time domain symbols appear in a set time unit, and the measurement reference signal cannot be transmitted on the first set of time domain symbols in an unset time unit (or a time unit which is not set or designated), or the control channel cannot be transmitted on the second set of time domain symbols in an unset time unit; and
  the index of the set time unit is sent to the receiving end by signaling.

In the solution, in the configuration information of the measurement reference signal, the index range of the time domain symbols occupied by the measurement reference signal includes one or more start time domain symbols of the second time unit;
  the second time unit is a time unit for transmitting the measurement reference signal.

In the solution, the set of time domain symbols occupied by the control channel in the second set of time domain symbols is a subset of the second set of time domain symbols.

In the solution, the control channel satisfies at least one of the following features:
  a minimum mapping unit of the control channel is a comb-shaped frequency domain block in the one symbol; and
  a minimum mapping unit of the control channel is a subcarrier group in a comb-shaped frequency domain block in the one symbol, wherein one comb-shaped frequency domain block includes more than one subcarrier group.

In the solution, one time domain symbol is one OFDM symbol;
  the control channel is a downlink control channel;
  the time unit is one subframe; and
  the control signaling is proprietary control signaling.

An embodiment of the present disclosure also provides a storage medium having stored therein a computer program configured to perform the method for transmitting a signal.

In the technical solution of the embodiments of the present disclosure, a measurement reference signal is configured to occupy a frequency domain resource in a first set of time domain symbols where a control channel is located; the configuration information of the measurement reference signal is sent by control signaling; the measurement reference signal is sent in a set N time units; and/or the control channel is transmitted in a second set of time domain symbols where the measurement reference signal is located;

and/or configuration information of the measurement reference signal is transmitted through control signaling, wherein in the configuration information of the measurement reference signal, a range of indices of time domain symbols occupied by the measurement reference signal includes one or more start time domain symbols in a second time unit, where the second time unit is a time unit for transmitting the measurement reference signal; the set of time domain symbols includes M symbols, where M is a natural number; and the measurement reference signal is a measurement reference signal port or a measurement reference signal resource, and the measurement reference signal resource includes at least one measurement reference signal port. The technical solutions provided by the present disclosure can solve the problem of waste of resources caused by signaling notification and reference signal time division transmission when the channel measurement signal is dynamically triggered. In addition, the present disclosure can increase the processing time for terminals to process the measurement reference signal, so that the terminals can feed back the measurement results quickly, and the terminals can even report measurement results in the current time unit. Moreover, the present disclosure can contemplate an application scenario: a resource pool of measurement reference signals is configured at a high layer. However, since the measurement reference signal is transmitted on demand, in this case, the measurement reference signal transmitted on demand in the resource pool of measurement reference signals can be notified. Thus, the present disclosure can realize that the measurement reference signal is sent on demand at the transmitting end while effectively improving the resource utilization of the triggered measurement reference signal.

DETAILED DESCRIPTION

In order to understand the features and technical contents of the embodiments of the present disclosure in more detail, the embodiments of the present disclosure are described in detail below with reference to the accompanying drawings. The accompanying drawings are for illustrative purposes only and are not intended to limit the embodiments of the present disclosure.

Figure 9:
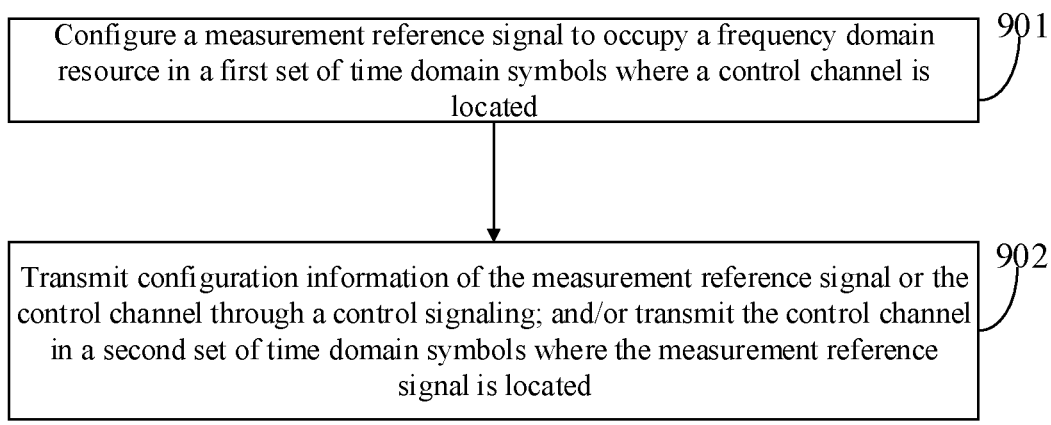
FIG. 9 is a flowchart of a method for transmitting a signal according to an embodiment of the present disclosure.

FIG. 9 is a flowchart of a method for transmitting a signal according to an embodiment of the present disclosure. As shown in FIG. 9, the method for transmitting the signal includes the following steps.

In step 901, a measurement reference signal is configured to occupy a frequency domain resource in a first set of time domain symbols where a control channel is located.

In step 902, configuration information of the measurement reference signal is transmitted through control signaling; and/or the control channel is transmitted in a second set of time domain symbols where the measurement reference signal is located.

The set of time domain symbols includes M symbols, where M is a natural number; the measurement reference signal is a measurement reference signal port or a measurement reference signal resource, and the measurement reference signal resource includes at least one measurement reference signal port.

The measurement reference signal is transmitted in a set N time units.

In the embodiment of the present disclosure, the configuration information includes at least one of the following information:
  an index of a time domain symbol occupied by the measurement reference signal in the first set of time domain symbols, an index of a frequency domain block of the measurement reference signal in the time domain symbol; information indicating whether to transmit the measurement reference signal; information indicating a transmission pattern of the measurement reference signal in the frequency domain block; information indicating whether to report channel state information (CSI) and information indicating whether to report the time-frequency resource where the CSI is located; configuration information of the first set of time domain symbols; and configuration information of the second set of time domain symbols.

One symbol includes MF frequency domain blocks, where MF is an integer greater than one.

In the embodiment of the present disclosure, at least one of the following information of the measurement reference signal is set with the receiving end: an index of a symbol occupied by the measurement reference signal in the first set of time domain symbols, an index of a frequency domain block of the measurement reference signal in the time domain symbol; information indicating whether to transmit the measurement reference signal; information indicating a transmission pattern of the measurement reference signal in the frequency domain block; and information indicating whether to report CSI and information indicating whether to report the time-frequency resource where the CSI is located.

In an embodiment of the present disclosure, in a time domain symbol, the control channel and the measurement reference signal are frequency division multiplexed.

In an embodiment of the present disclosure, the frequency division multiplexing satisfies at least one of the following features:
  frequency division multiplexing of a combed structure is employed;
  a number of the frequency domain blocks occupied by the control channel is greater than a number of the frequency domain blocks occupied by the measurement reference signal;
  an index set of the frequency domain blocks that may be occupied by the measurement reference signal is a subset of an index set of the frequency domain blocks that may be occupied by the control channel;
  the index set of the frequency domain blocks that may be occupied by the control channel includes all of the frequency domain blocks in the symbol; and
  the index set of the frequency domain blocks occupied by the control channel and the index set of the frequency domain block occupied by the measurement reference signal are set with the receiving end.

In an embodiment of the present disclosure, the frequency domain block of the measurement reference signal in one symbol is larger than the frequency domain block corresponding to the control channel;

The frequency domain block of the measurement reference signal in one symbol includes a frequency domain block corresponding to NF control channels, where NF is an integer greater than 1.

In an embodiment of the present disclosure, the configuration information satisfies at least one of the following features:
  one measurement reference signal port occupies a resource in NR symbols in the first set of time domain symbols, 1≤NR≤M;
  one measurement reference signal resource occupies a resource in NR1 symbols in the first set of time domain symbols, 1≤NR1≤M;
  the control channel occupies MC symbols in the second set of time domain symbols in which the measurement reference signal is located, 1≤MC≤MCT, where the set of time domain symbols in which the measurement reference signal is located includes MCT time domain symbols;
  the one measurement reference signal resource occupies a resource in the first set of time domain symbols, and does not occupy a resource outside the first set of time domain symbols;
  the one measurement reference signal port occupies a part of the frequency domain block resource in the time domain symbol; and
  the control signaling is transmitted in the control channel.

In a specific embodiment, NR is 1 and NR1 is 1.

In an embodiment of the present disclosure, one measurement reference signal resource occupies resources in the first set of time domain symbols and a resource outside the first set of time domain symbols; and
  one measurement reference signal port occupies resources in the first set of time domain symbols and a resource outside the first set of time domain symbols.

In an embodiment of the present disclosure, the second set of time domain symbols satisfies at least one of the following features:
  the second set of time domain symbols is at an end position of a downlink transmission domain of a first time unit;
  x time domain symbols are between a start symbol of the second set of time domain symbols and a start position of the first time unit, where x is a natural number greater than 0; and
  the time domain symbols in the second set of time domain symbols are consecutive;

wherein the first time unit is a time unit where the second set of time domain symbols is located.

In an embodiment of the present disclosure, the first set of time domain symbols and/or the second set of time domain symbols appear in a set time unit, and the measurement reference signal cannot be transmitted on the first set of time domain symbols in an unset time unit, or the control channel cannot be transmitted on the second set of time domain symbols in an unset time unit.

The index of the set time unit is sent to the receiving end by signaling.

In an embodiment of the present disclosure, in the configuration information of the measurement reference signal, the index range of the time domain symbols occupied by the measurement reference signal includes one or more beginning time domain symbols of the second time unit;
wherein the second time unit is a time unit for transmitting the measurement reference signal.

In an embodiment of the present disclosure, the set of time domain symbols occupied by the control channel in the second set of time domain symbols is a subset of the second set of time domain symbols.

In an embodiment of the present disclosure, the control channel satisfies at least one of the following features:
a minimum mapping unit of the control channel is a comb-shaped frequency domain block in the one symbol; and
a minimum mapping unit of the control channel is a subcarrier group in a comb-shaped frequency domain block in the one symbol, wherein one comb-shaped frequency domain block includes more than one subcarrier group.

In an embodiment of the present disclosure, one time domain symbol is one OFDM symbol;
the control channel is a downlink control channel;
the time unit is one subframe; and
the control signaling is proprietary control signaling.

The method for transmitting a signal according to an embodiment of the present disclosure is further described in detail below in conjunction with a specific application scenario.

Embodiment 1

In this embodiment, the measurement reference signal is transmitted on the first set of time domain symbols on which the control channel is located, wherein the first set of time domain symbols is in one or more symbols at the beginning of the time unit in which the first set of time domain symbols is located.

Specifically, as shown in FIG. 1a to FIG. 1d, in one subframe (i.e., one time unit as described above), the first two symbols are the transmission domain of the downlink control channel. That is, in this case, the two symbols (the symbol 0 and the symbol 1 as shown in the figure) constitute the above-mentioned set of time domain symbols.

As shown in FIG. 1a to FIG. 1d, the measurement reference signal is on the set of time domain symbols where the control channel is located. The transmission structure in the one time unit (i.e., the above time unit) in FIGS. 1a to 1d is only an example, and does not exclude other transmission structures. The transmission structure includes constituting components in one time unit which may be downlink control, downlink data, GP (Guard Interval), uplink data, and uplink control.

Figure 1A:
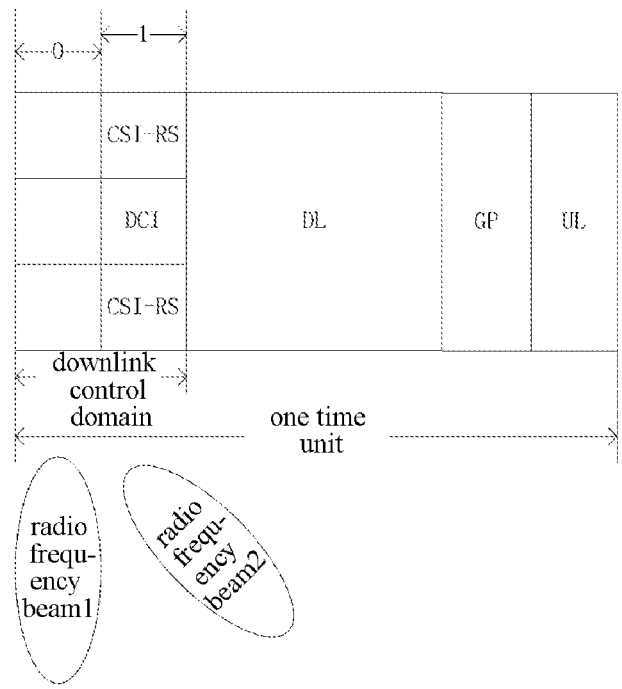
FIG. 1a is a first diagram showing an example in which a measurement reference signal and control signaling are transmitted on the same symbol.
Figure 1B:
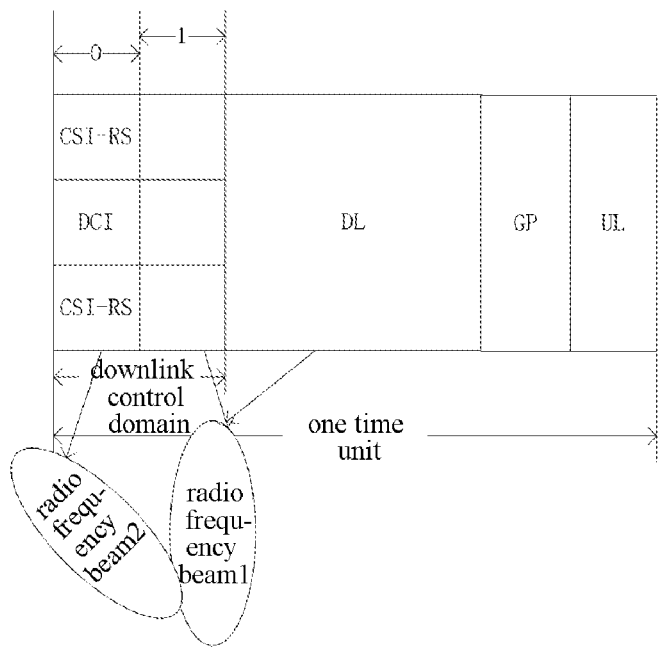
FIG. 1b is a second diagram showing an example in which a measurement reference signal and control signaling are transmitted on the same symbol.
Figure 2:
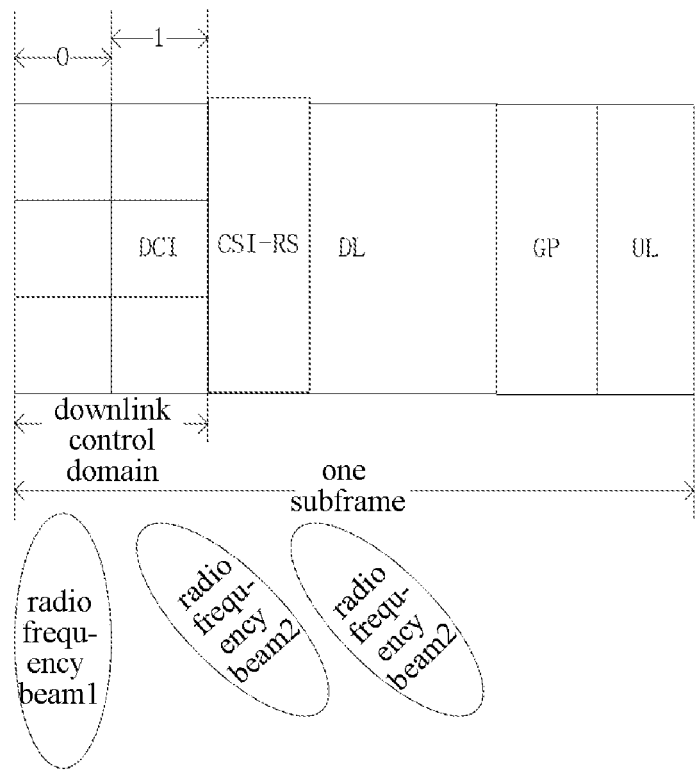
FIG. 2 is a diagram showing an example of trigger signaling for notifying a measurement reference signal and a measurement reference signal are transmitted in a time division transmission manner.

As shown in FIG. 1a, the transmission of the CSI-RS (i.e., the above-mentioned measurement reference signal) requires notification through dynamic signaling. In particular, when a radio frequency beam of other control information (hereinafter referred to as second control information, where the second control information may include a plurality of pieces of control signaling) is different from a radio frequency beam for notifying the CSI-RS control signaling (hereinafter referred to as first control information), time-division multiplexing of the first control information and the second first control information is needed, or even only for the first control information, an additional one OFDM symbol needs to be used. In the case of a large bandwidth, the first control information or the second control information cannot occupy the whole bandwidth, or the first control information and a part of control signaling of the second control information cannot occupy the whole bandwidth. The CSI-RS reference signal can be transmitted on the symbol for notifying the first control information. As shown in FIG. 1a, the symbol 1 includes three frequency domain resource blocks. The downlink control information of the first control information (the DCI shown in the figure) occupies the middle frequency domain block, and the other two frequency domain blocks are used to transmit the CSI-RS. In FIG. 1a, the transmission beams of OFDM0 and OFDM1 are different. If the CSI-RS and the first control signaling in FIG. 2 are transmitted on different symbols, the first control signaling has to be transmitted with the radio frequency beam 2 on one symbol, and the CSI-RS signal also needs to be transmitted using one symbol with the radio frequency beam 2. The first control signaling cannot occupy all the resources on the OFDM1, there is no downlink data under the radio frequency beam 2 that the user can schedule, and the CSI-RS cannot occupy all the resources on the OFDM2, which may cause resource waste. Therefore, the method of FIG. 1a has higher resource utilization than the method of FIG. 2. Moreover, the transmission mode of FIG. 1a can provide more CSI-RS processing delay to the terminal than that of FIG. 2, so that the terminal can report CSI based on the CSI-RS measurement result in the current time unit. However, in order to further reduce the switching times of radio frequency beams for the base station, as shown in FIG. 1b, the CSI-RS and the notification of the first control information may be placed in the OFDM0, and the second control information may be placed in the OFDM1. Then, if the radio frequency beams of the second control information and the downlink data corresponding to the second control information are the same, the number of times for the base station to switch radio frequency beams can be reduced. However, compared with FIG. 1b, in FIG. 1a, when the radio frequency beam for the downlink control information is different from the radio frequency beam for the corresponding downlink data, processing delay may be prolonged for the terminal. So, FIG. 1a and FIG. 1b both have advantages and disadvantages. As an example implementation of the terminal, the two solutions are not excluded in this embodiment.

Figure 1C:
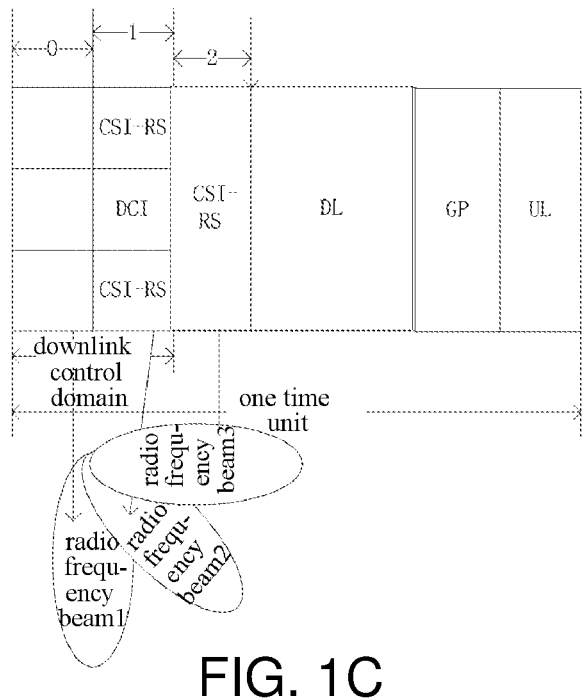
FIG. 1c is a first diagram showing an example in which a measurement reference signals and control signaling are transmitted on the same symbol, and the measurement reference signal occupies a resource outside the set of time domain symbols.
Figure 1D:
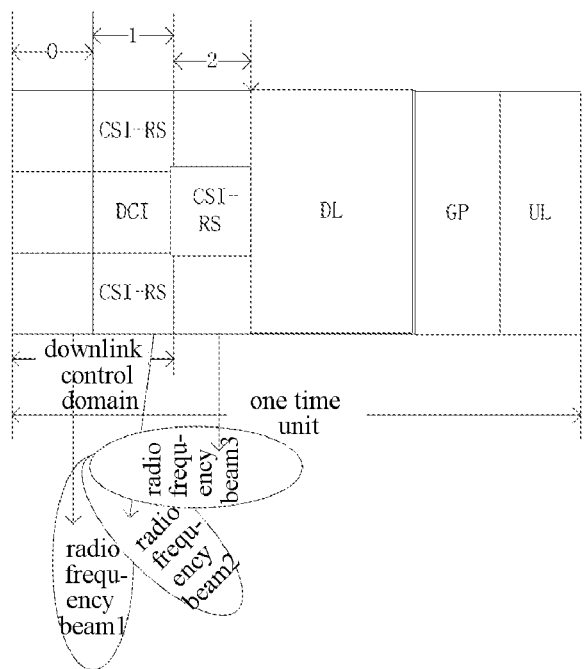
FIG. 1d is a second diagram showing an example in which a measurement reference signals and control signaling are transmitted on the same symbol, and the measurement reference signal occupies a resource outside the set of time domain symbols.

If it is still necessary to measure other beam directions, and the other beam directions require different radio frequency beams from the radio frequency beams 2, it is necessary to transmit a measurement reference signal on a symbol outside the set of time domain symbols, as shown in FIG. 1c. If the beam under the radio frequency beam 3 needs to be measured, the remaining CSI-RS signals have to be transmitted on the symbol 2. Or, the mixed beam 1 is measured under the radio frequency beam 2 in OFDM1, and the mixed beam under the radio frequency beam 2 needs to be measured on the OFDM2. 2. Or, as shown in FIG. 1d, the CSI-RS only occupies a part of the bandwidth on the OFDM2. Preferably, in the OFDM2, the CSI-RS occupies the part of the frequency band occupied by the DCI in the OFDM1. That is, one CSI-RS port occupies part of the bandwidth of the OFDM1 (such as the frequency domain blocks 1 and 3 in FIG. 1d) and the part of the bandwidth in OFDM2 (such as the frequency domain block 2 in FIG. 1d), the union of the two bandwidths constitutes the system bandwidth.

In the above embodiment, the radio frequency beam direction is only an example, and when there are a plurality of radio frequency links, different mixed beams can be formed by summing weighted basebands. For one symbol, the major concern is the radio frequency beam direction of the radio frequency link, since one radio frequency link on one symbol can correspond to one radio frequency beam direction in one full bandwidth.

For the relationship between the measurement reference port and the set of time domain symbols of the control channel, a first implementation is that one CSI-RS port occupies part or all of the symbols in the set of time domain symbols, and does not occupy a resource on a symbol outside the set of time domain symbols. That is, one of the measurement reference signal ports occupies a resource in the NR symbols in the set of time domain symbols, 1≤NR≤M, and one measurement reference signal port in FIG. 1a occupies only the resource of one symbol. This embodiment does not exclude that one measurement reference port occupies resources in more than one symbol, that is, one CSI-RS port in FIG. 1a can occupy resources in two symbols (i.e., OFDM0 and OFDM1). For the relationship between the measurement reference port and the set of time domain symbols of the control channel, a second implementation is a CSI-RS port occupies a part or all of the symbols in the set of time domain symbols, and also occupies a symbol outside the set of time domain symbols. As shown in FIGS. 1c to 1d, one CSI-RS port occupies resources in the set of time domain symbols {symbol 0, symbol 1}, and may also occupy a resource in symbol 2.

A first implementation of a relationship between one CSI-RS resource and a set of time domain symbols of the control channel is that one CSI-RS resource only occupies all or part of the symbols in the set of time domain symbols, and does not occupy a symbol outside the set of time domain symbols. As shown in FIG. 1a to FIG. 1b, one CSI-RS resource only occupies resources in the set of time domain symbols {symbol 0, symbol 1}, and does not occupy a symbol outside the set of time domain symbols.

A first implementation of a relationship between one CSI-RS resource and a set of time domain symbols of the control channel is that one CSI-RS resource occupies all or part of the symbols in the set of time domain symbols, and also occupies a symbol outside the set of domain symbols. As shown in FIG. 1c to FIG. 1d, one CSI-RS resource occupies a resource in the set of time domain symbols {symbol 0, symbol 1}, and also occupies a resource in a symbol outside the set of time domain symbols, such as the resource in the symbol 2.

In the above implementations, one CSI-RS resource includes one or more CSI-RS ports. Preferably, one CSI-RS resource corresponds to one piece of CSI-RS configuration information. The set of time domain symbols is the set of time domain symbols where the control channel is located, that is, a set constituted by {symbol 0, symbol 1} in FIGS. 1a to 1d.

Figure 1E:
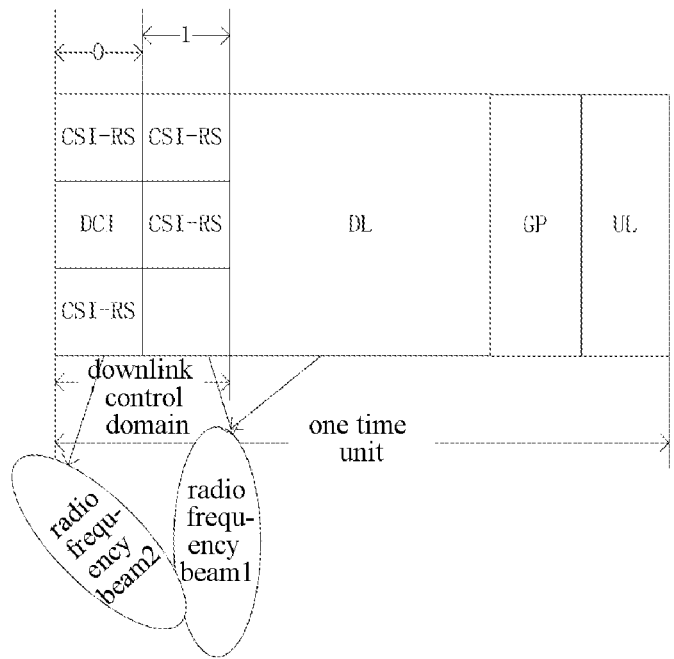
FIG. 1e is a third diagram showing an example in which a measurement reference signals and control signaling are transmitted on the same symbol, and the measurement reference signal occupies a resource outside the set of time domain symbols.
Figure 1F:
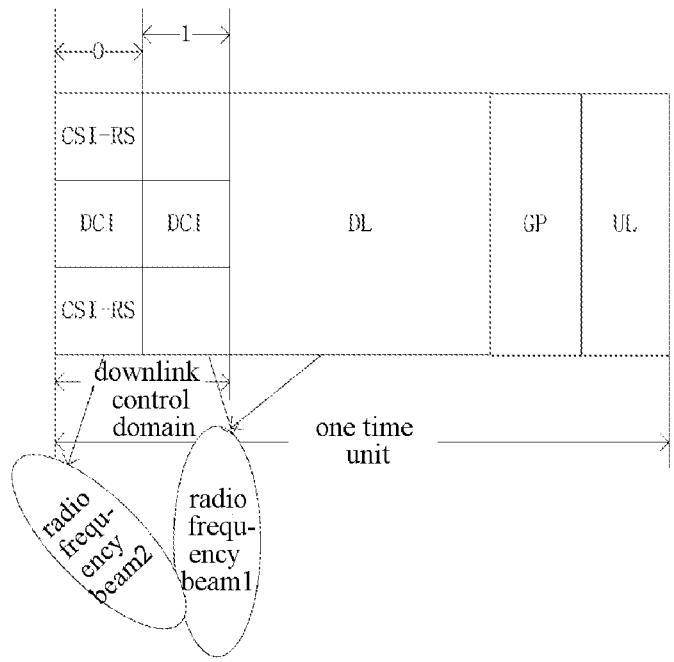
FIG. 1f is a fourth diagram showing an example in which a measurement reference signals and control signaling are transmitted on the same symbol, and the measurement reference signal occupies a resource outside the set of time domain symbols.

In FIGS. 1a to 1d, in the set of time domain symbols, the first control signaling and the CSI-RS port (or the CSI-RS resource) occupy the same set of symbols. However, the present embodiment does not exclude that the symbol occupied by the first control signaling is a subset of the set of symbols occupied by the CSI-RS. As shown in FIG. 1e, the first control signaling is in OFDM0, but the CSI-RS may occupy resources on the symbols {OFDM0, OFDM1}. However, the present embodiment does not exclude that the symbol occupied by the CSI-RS in the set of time domain symbols is a subset of the symbols occupied by the first control signaling in the set of time domain symbols, as shown in FIG. 1f.

As a first implementation, symbols included in the set of time domain symbols is of a time unit level. That is, the symbols included in the set of time domain symbols are the symbols for transmitting all control information in that time unit. For example, for symbols occupied by PDCCH (downlink control channel), the PDCCH is used to transmit all of the control information needs to be transmitted in that time unit, or the control information transmitted with the PDCCH includes control information for multiple users. The number of symbols included in the PDCCH in each time units may be notified through a PCFICH-like information. The time units are variable, or the symbols in the set of symbols in each time unit are semi-statically configured as invariable for a period of time. When the symbols in the set of symbols need to be changed, it may be notified through signaling. The signaling may be dynamic signaling, or may be semi-static signaling.

As a second implementation, symbols included in the set of time domain symbols is UE-Specific, that is, the number of OFDM symbols included in the set of time domain symbols is UE-Specific. In the same time unit, the set of time domain symbols for user 1 includes only OFDM0, and the set of time domain symbols corresponding to user 2 includes symbol 0 and symbol 1. For example, through signaling configuration, the blind detection range of the control channel of the user 1 is symbol 0, and the blind detection range of the control channel of the user 2 is the symbol 0 and the symbol 1.

Figure 3A:
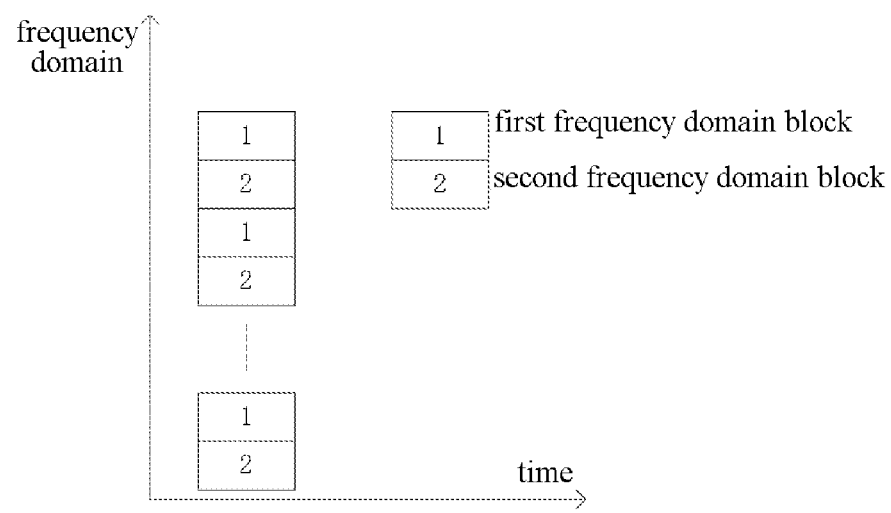
FIG. 3a is a first diagram showing an example in which different frequency domain blocks in a comb-shaped structure are formed on the symbol.
Figure 3B:
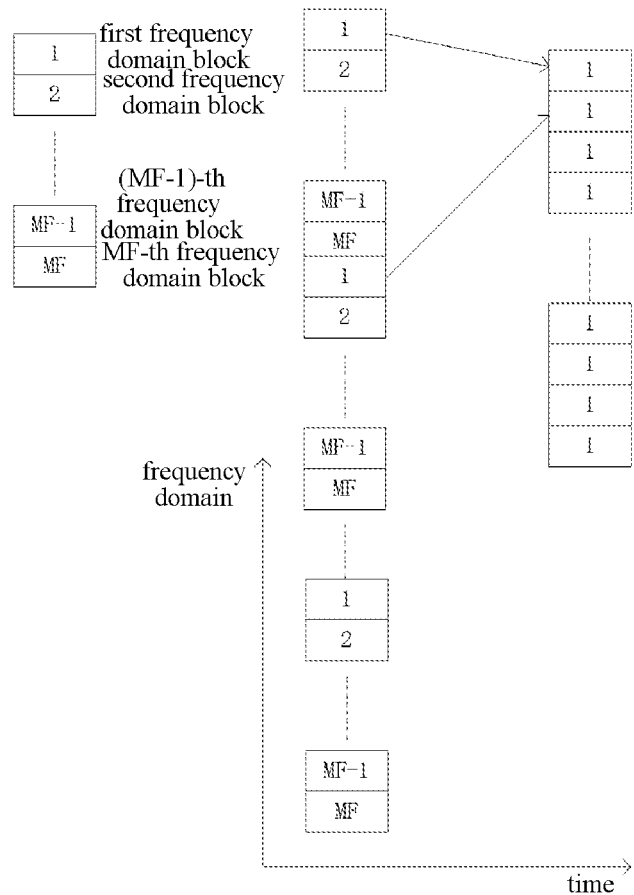
FIG. 3b is a second diagram showing an example in which different frequency domain blocks in a comb-shaped structure are formed on the symbol.

In the above implementations, the CSI-RS and the control channel are frequency division multiplexed. One way for frequency division multiplexing is to include consecutive subcarriers in each frequency domain block as shown in FIGS. 1a to 1d. A second way for frequency division multiplexing is a comb-shaped structure, that is, the frequency domain blocks occupy the subcarriers alternately. As shown in FIG. 3a, the subcarriers in one symbol are divided into a frequency domain block 1 and a frequency domain block 2 in a combed polling manner, the frequency domain block 1 is used for the control channel, and the frequency domain block 2 is used for the measurement reference signal. Alternatively, as shown in FIG. 3b, the subcarriers in one symbol are divided into MF frequency domain blocks in a combed polling manner, preferably MF=12n, 16n, where n is an integer greater than or equal to 1. However, this embodiment does not exclude other values of MF. Each of the control signaling (like DCI in LTE) may occupy one or more comb-shaped frequency domain blocks, each of the measurement reference signal ports may occupy one frequency domain block, and one measurement reference signal resource may include multiple ports, and thus one measurement reference signal resource can occupy a plurality of comb-shaped frequency domain blocks, and different ports in one measurement signal resource can be multiplexed by frequency division plus code division manners. In order for the terminal to detect the uniformity of the control channels, it is preferred that the multiplexing modes of the different control signaling in the control channels also adopt a combed structure. That is, as shown in FIG. 3b, each symbol in the control channel (such as the symbol 0 and the symbol 1 in FIGS. 1a to 1d) is divided into MF frequency domain blocks in a combed multiplexing manner, and a minimum resource block (such as REG (resource element group resource group) in LTE) that is used for control signaling mapping is a frequency domain block. However, one control signaling can also occupy multiple frequency domain blocks. Or, when the system bandwidth is large, one frequency domain block may be divided into multiple segments. As shown in FIG. 3b, all the subcarriers in the first frequency domain block are divided into four resource groups, and one resource group is one REG, in which resources in one resource group have an interval of MF subcarriers, or resources in one resource group have an interval of x1×MF subcarriers, where x1 is a positive integer, preferably x1 is the number of resource groups included in one frequency domain block. The terminal first searches for control signaling in the search space. Preferably, the union of different users' search spaces covers the full system bandwidth of the symbol. After the terminal searches for the first control information, the first control information informs the index of the frequency block occupied by the measurement reference signal, or the first control information simply indicates that the measurement reference signal is sent in the set of time domain symbols. The index of the frequency domain block occupied by the measurement reference signal is fixed, and/or the symbol occupied by the measurement reference signal in the set of time domain symbols is fixed, or the time domain symbol occupied by the measurement reference signal is obtained according to the time domain symbol where the first control information is located, and the first control information only needs to configure information such as the number of ports in one measurement reference resource. When a frequency domain block is further divided into multiple resource groups, in one manner, the measurement reference signal occupies all resources in one frequency domain block, and in another manner, the measurement reference signal occupies some resource groups in one frequency domain block. The index of the occupied group is fixed or indicated by control signaling. The advantage of the combed frequency division multiplexing method for the frequency domain block lies in that when the reference signal and the control channel are frequency division multiplexed, the measurement reference signal can be transmitted in full bandwidth.

In the above implementation, the control channel (including the first control information and the second control information) and the measurement reference signal in one symbol may be frequency division multiplexed. However, since the control channel and the measurement reference signal are sent on demand, in a first implementation, the frequency domain block that the control channel can occupy is all frequency domain blocks in one symbol, the first control information indicates the frequency domain block occupied by the measurement reference signal, or the index of the frequency domain block occupied by the measurement reference signal is fixed. That is, the set of frequency domain blocks occupied by the measurement reference signal is a subset of the frequency domain blocks occupied by the control channel. In a second implementation of this embodiment, the frequency domain blocks that the control channel can occupy is a part of the frequency domain blocks, and the frequency domain blocks that the measurement reference signal can occupy is also a part of the frequency domain blocks, and the two sets frequency domain blocks may have intersection, but there is no subset relationship between the two. Even the intersection may be empty.

In this embodiment, the first control signaling sends configuration information of the measurement reference signal, where the configuration information includes at least one of the following: an index of a symbol occupied by the measurement reference signal in the set of time domain symbols, an index of a frequency domain block in the symbol; information indicating whether to transmit the measurement reference signal in the symbol; information indicating a transmission pattern of the symbol in the frequency domain block; and information indicating whether to report channel state information (CSI) and to report the time-frequency resource where the CSI is located. The transmission pattern includes a transmission density, a multiplexing manner of the ports and so on. Specifically, the transmission density includes a transmission density in a frequency domain block, or an index of the resource group occupied in a frequency domain block. The multiplexing manner of the plurality of ports includes the length of code division multiplexing, the manner of time division/frequency division/code division multiplexing.

In this embodiment, one or more of the following information of the measurement reference signal is set (or agreed) by the transmitting end and the receiving end: an index of a symbol occupied by the measurement reference signal in the set of time domain symbols, an index of a frequency domain block in the symbol; information indicating whether to transmit the measurement reference signal in the symbol; information indicating a transmission pattern of the symbol in the frequency domain block; and information indicating whether to report channel state information (CSI) and to report the time-frequency resource where the CSI is located. The transmission pattern includes a transmission density, a multiplexing manner of the ports and so on. Specifically, the transmission density includes a transmission density in a frequency domain block, or an index of the resource group occupied in a frequency domain block. The multiplexing manner of the plurality of ports includes the length of code division multiplexing, and the manner of time division/frequency division/code division multiplexing.

In the above embodiment, the measurement reference signal may also be a Beam Reference Signal (BRS), a Beam Refinement Reference Signal (BRRS), and a Channel Measurement Reference Signal (CSI-RS), or other equivalent names. In general, the measurement reference signals is use for measuring a channel state, where the channel state includes measurement of a beam state, which do not constitute an undue limitation to the present disclosure.

The one time unit may be one subframe or an interval, and one interval may include one or more subframes.

In this embodiment, the one symbol may be one OFDM symbol.

In this embodiment, the sending end may be a base station, and the receiving end may be a terminal. However, this embodiment does not exclude other implementation entities.

Embodiment 2

In the embodiment, the control channel is sent in a second set of time domain symbols (hereinafter referred to as a time domain symbol) where the measurement reference signal is located, and the set of time domain symbols is not at the beginning of a time unit, or the index of the start symbol of the set of time domain symbols is not 0, that is, the interval between the start symbol of the set of time domain symbols and the start position of the time unit is x symbols, where x is an integer greater than 0, or the set of time domain symbols includes, in addition to the time domain symbol where the downlink control domain is located, also includes other time domain symbols.

Figure 4A:
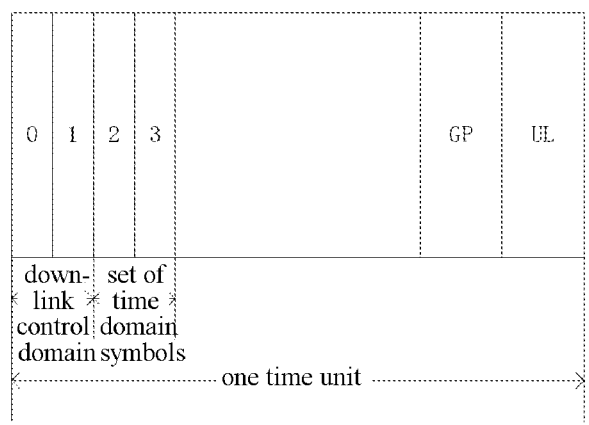
FIG. 4a is a diagram showing an example in which the set of time domain symbols occupies a immediately adjacent downlink control domain in one time unit.
Figure 4B:
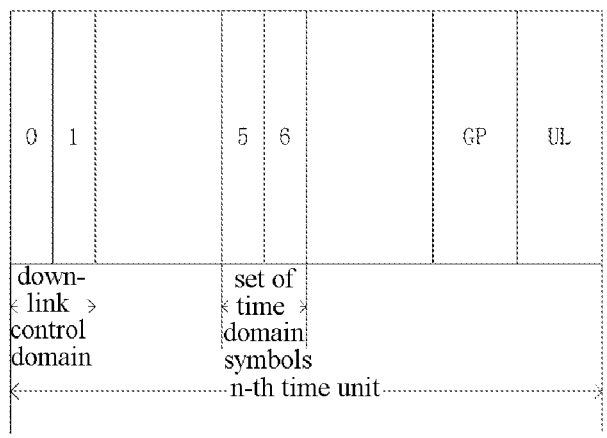
FIG. 4b is a diagram showing an example in which the set of time domain symbols occupies a middle symbol in one time unit.
Figure 4C:
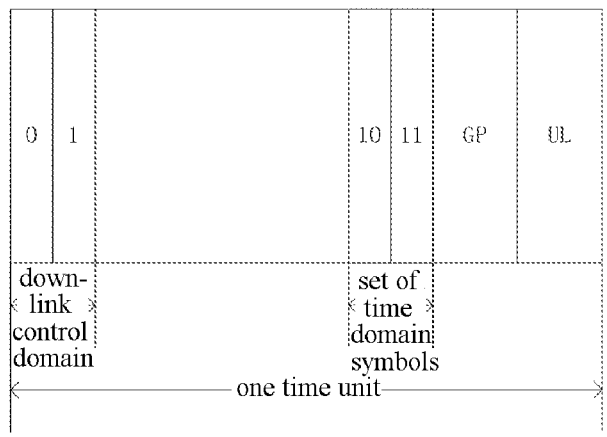
FIG. 4c is a first diagram showing an example in which the set of time domain symbols occupies an end position in a downlink transmission domain in one time unit.
Figure 4D:
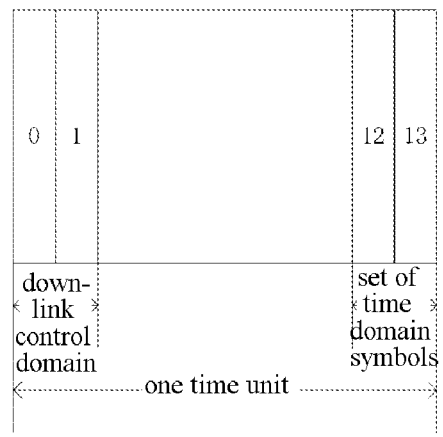
FIG. 4d is a first diagram showing an example in which the set of time domain symbols occupies an end position in a downlink transmission domain in one time unit.

As shown in FIGS. 4a to 4d, FIGS. 4a to 4d show the locations of the set of time domain symbols. In the figures, in the set of time domain symbols includes 2 symbols, which is only an example, and does not exclude other numbers of symbols. The symbols in the set of time domain symbols in FIG. 4a include symbols immediately after the downlink control domain; the start symbol in the set of time domain symbols and the end symbol of downlink control domain in FIG. 4b are separated by several symbols, such as {symbol 5, symbol 6}; the set of time domain symbols in FIG. 4c includes a time domain symbol at an end position of a downlink transmission domain in a time unit, such as symbols {10, 11}; or the set of time domain symbols is located at the end position of a time unit, as shown in FIG. 4d, the set of symbols consists of {symbol 12, symbol 13}.

Figure 4F:
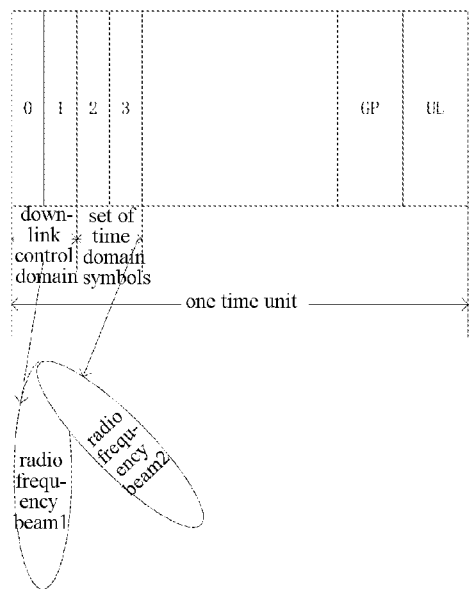
FIG. 4f is a diagram showing an example in which a radio frequency beam of a downlink control domain is different from a radio frequency beam of a measurement reference signal.
Figure 4E:
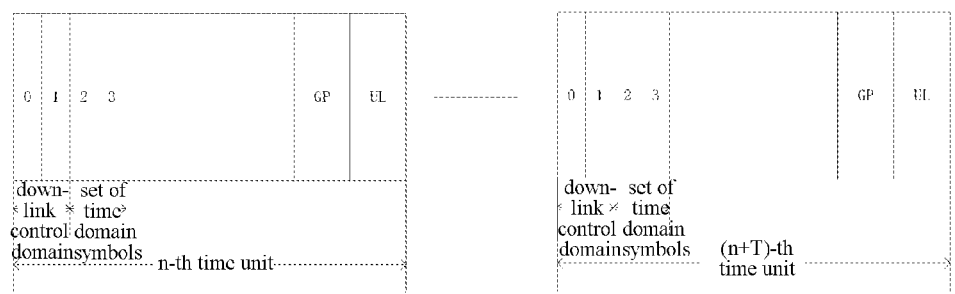
FIG. 4e is a diagram showing an example in which the set of time domain symbols in a configured T time units.

Further, the set of time domain symbols is only in the configured time unit. As shown in FIG. 4e, it may be configured by signaling that a measurement reference signal may be transmitted in the set of time domain symbols in the n-th time unit to the (n+T)-th time unit. Whether to transmit a measurement reference signal is controlled by the base station. If a measurement reference signal is transmitted, the base station will send first control information. Then, the terminal may firstly detect the first control information on the time units n~n+T. If the first control information is detected, the measurement reference signal may be then detected, and the terminal may perform rate matching based on the detected first control information. In FIG. 4a to FIG. 4d, a first manner is that the terminal needs to search the control channel in both of the downlink control domain and the set of time domain symbols. A second manner is that the terminal detects only one of the downlink control domain and the set of time domain symbols, preferably detects the set of time domain symbols and the terminal does not need to detect the control channel in the downlink control domain. A third manner is configuring the terminal to detect both of the downlink control domain and the set of time domain symbols, or to detect only one of them. That is, the control signaling and the measurement reference signal may be multiplexed in the set of time domain symbols from the n-th time unit to the (n+T)th time unit, and in other time units, no such multiplexing exists. Or, such time units appear periodically over a time period. In a time unit which is not set (or designated), the terminal does not detect the control channel in a set of time domain symbols outside the control channel domain, wherein the set of time domain symbols is the time domain symbols as shown in FIGS. 4a-4d.

In this embodiment, preferably, the control signaling transmitted in the time domain symbol is common control signaling, and all terminals may know that the measurement reference signal is transmitted on the time domain symbols. Of course, if the configuration of these sets of time domain symbols is UE-Specific, then such common control signaling will only be detected by the notified terminal. However, if the configuration of the set of time domain symbols is common, the terminal that does not need to measure these measurement reference signals can perform rate matching based on the obtained common control signaling. Of course, the above control signaling may also be UE-Specific. For example, in the time unit n~the time unit n+T, the terminal detects the control signaling of the downlink control domain, and also detects the control signaling in the time domain symbol, and obtains the number of time domain symbols occupied by the measurement reference signal, or the index of the time domain symbol, so as to perform rate matching. For example, the terminal 1 detects that the control signaling detected at the downlink control domain of the time unit in FIG. 1a indicates the time and frequency resource occupied by downlink data information, such as how many PRBs are occupied, and one PRB starts from the symbol 2. Then, the terminal further detects whether a measurement reference signal has been transmitted on the symbols 2 and 3 through the control signaling in the symbols 2 and 3. If the first control information is detected, and rate matching is performed according to the transmission of the measurement reference signal indicated by the first control information, it is considered that the start symbol of the downlink data domain is a symbol 4, or the configuration information of the measurement reference signal indicates the symbol occupied by the measurement reference signal, such as all of the measurement reference signals only occupy resources in the symbol 2, and the terminal may consider the start symbol of the downlink data domain is the symbol 3. Alternatively, if the measurement reference signal occupies resources in the symbols 2 and 3, the frequency part not occupied is considered for data transmission, and the data transmission rate matching is performed. Alternatively, the resources except for the resources for transmitting the control signaling and the measurement reference signal in the symbols 2 and 3 are considered as for data transmission. Alternatively, for such time units, the symbol for the measurement reference signal is considered not for data transmission, and in this case, it is necessary to notify an index of symbol that needs to be chiseled. In relevant control information corresponding to the data transmission, the range of the indices of the symbols to be chiseled is larger than the range of the indices of the chiseled symbols in a general time unit. The general time unit is a time unit that has no such set of time domain symbols. For example, in a general time unit, 2 bits are needed for chiseling a symbol, while in a time unit having the set of time domain symbols, 3 bits are needed for chiseling a symbol. So, the number of bits for notifying time domain resources is determined according to the type of the time unit. The first time unit type is a unit having the set of time domain symbols, and the second time unit type is a unit having no such set of time domain symbols.

The minimum resource unit of one control signaling of the downlink control domain and the minimum resource unit of one control signaling in the set of time domain symbols in FIG. 4a to FIG. 4d may be the same or different. Preferably, the minimum resource unit of the control signaling in the set of time domain symbols may be one of the frequency domain blocks in the comb-shaped structure, as shown in FIGS. 3a to 3b, or the minimum resource unit is one resource group of one frequency domain block, as shown in FIG. 3b. The minimum resource unit of one control signaling in the downlink control domain may be obtained from other division manner, that is, obtained in a way other than in the comb-shaped structure, to obtain a different minimum resource unit.

Figure 5A:
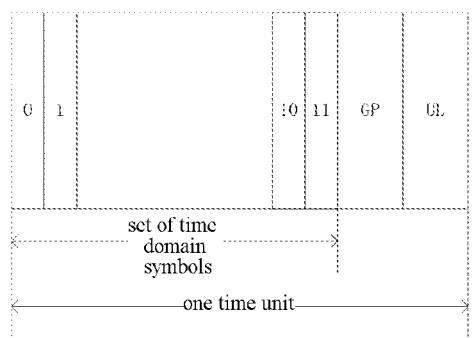
FIG. 5a is a first diagram showing an example in which the set of time domain symbols occupies the entire downlink transmission domain of one time unit.
Figure 5B:
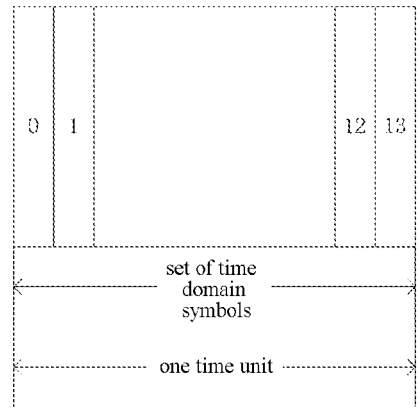
FIG. 5b is a second diagram showing an example in which the set of time domain symbols occupies the entire downlink transmission domain of one time unit.
Figure 5C:
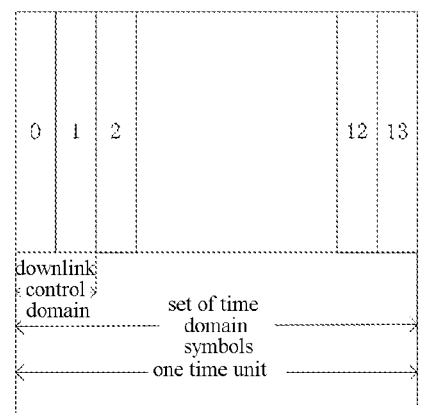
FIG. 5c is a third diagram showing an example in which the set of time domain symbols occupies the entire downlink transmission domain of one time unit.

For the set of time domain symbols, as shown in FIGS. 5a-5b, the time domain symbols may also include all downlink transmission domains of one time unit, and even downlink transmission domains of a plurality of time units. In FIGS. 5a-5b, a first implementation is that the terminal only detects control signaling for notifying the configuration information of the measurement reference signal on each symbol of the set of time domain symbols. A second implementation is detecting a general downlink control signaling on the start one or more OFDM symbols by the terminal, where the general downlink control signaling includes configuration information for notifying the measurement reference signal and data scheduling information, and detecting the configuration information for notifying the measurement reference signal on a symbol after the start one or more symbols, as shown in FIG. 5c. In this case, the measurement reference signal may be or may not be sent on the configured time domain symbol. When no measurement reference signal is sent, the scheduling information may be sent in the previous downlink control domain, so that the time unit can be used to send downlink data information. Or, in the time unit shown in FIG. 5b, the downlink control signaling may also be sent. Then, the time unit sets where the time domain symbols are located may preferably be non-consecutive. For example, in the time unit n~the time unit n+T, one time unit in each T1 time units is of the structure as shown in FIG. 4a to FIG. 4d, or of the structure as shown in FIG. 5a~FIG. 5c. Other time units have no such set of time domain symbols, thereby reducing the complexity in detecting control information for the terminal.

Figure 5D:
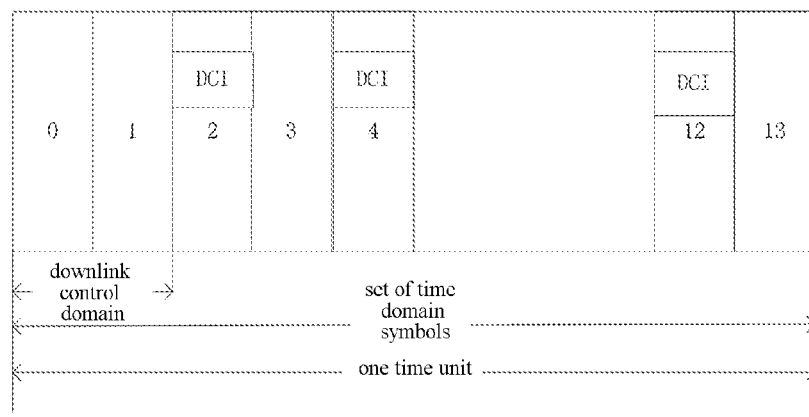
FIG. 5d is a diagram showing an example in which time domain symbols that may be occupied by the control channel are a subset of time domain symbols that may be occupied by the measurement reference signal.

In the set of time domain symbols, when the time domain symbol is a symbol outside the downlink control domain, a first manner is that the terminal detects the first control information on each symbol in the set of time domain symbols, and the first control information can be sent on each symbol in the set of time domain symbols. A second manner is that the terminal detects the control channel on each symbol in the set of time domain symbols, and the first control information is sent on part of the symbols in the set of time domain symbols. A third manner is that the terminal detects the control channel on part of the symbols in the set of time domain symbols, wherein the part of the symbols are configured or agreed with the base station. As shown in FIG. 5d, it is set that the control signaling is sent on the even-numbered symbols, and the terminal only needs to detect the control channel on the even-numbered symbols. For example, the terminal 1 detects the first control information on the symbol 2, and the first control information may indicate indices of symbols for the measurement reference signal of the terminal 1 in the set of time domain symbols (a set of {symbol 0~symbol 13}). That is, in this case, the measurement reference signal of the terminal 1 may occupy any resource in the symbol 0~the symbol 13.

In the embodiment, the multiplexing manner of the measurement reference signal and the first control information in the time domain symbol may be that in the manner of Embodiment 1, i.e. frequency division multiplexing. However, different from the embodiment 1, the control information transmitted in the set of time domain symbols may be different. In a first implementation, only the first control information is in the set of time domain symbols, where the first control information is for configuring the resource of the measurement reference signal. In a second implementation, in the set of time domain signals, in addition to transmitting the first control information, the second control information may be transmitted. This is because there may be more opportunities for beam switching, and the measurement reference signal and the second control information may be transmitted on the switching sessions of the beams. As shown in FIG. 4f, when the radio frequency beam of the downlink control domain is a beam 1, and the radio frequency beam of the set of time domain symbols (the set of {symbol 2, symbol 3}) is a beam 2, the first control information may be sent to the user 2 on the symbol 2 and the symbol 3, to instruct the user 2 to process the measurement reference signal, and further, the second control information is sent to the user 1 on the symbols 2 and 3, where the second measurement reference information includes control information other than the measurement reference signal.

In this embodiment, when the set of time domain symbols is relatively large, in order to reduce the complexity of detecting the control channel in the set of time domain symbols for the terminal, the detection range of the terminal may be further determined according to the logical beam in which the terminal resides. The range of detection is different for different logical beam. For example, if the logical beam is 0, only the control information needs to be detected on one symbol in the set of time domain symbols. For example, if the logical beam is 1, it is only necessary to detect the control information on two symbols in the set of time domain symbols. Specifically, for example, when the set of time domain symbols includes 2 symbols, and the total number of the logical beams is 4, the following table can be established. In this way, the detection range changes as the logical beams change. The time domain symbol 0 is the start symbol of the set of time domain symbols. That is, the numbers of the time domain symbols in the table 1 is the logic numbers of the set of time domain symbols. Specifically, as shown in FIG. 4a, the set of time domain symbols is composed of {symbol 2, symbol 3}, and symbol 0 in Table 1 corresponds to symbol 2.

TABLE 1

| Logical Beam Number | Detection Range of Control Channel (Time Domain Symbol) |
| --- | --- |
| 0, 1 | 0 |
| 2, 3 | 0, 1 |

If the downlink control domain is not included in the set of time domain symbols, the terminal needs to be notified to detect the control channel in the downlink control domain and the set of time domain symbols. As shown in FIG. 4a to FIG. 4d, one implementation is that the terminal detects the control channel on all symbols of downlink control domain, and the detection range of the control channel may be determined according to the logical beam indices in the set of time domain symbols.

Embodiment 3

In the Embodiment 1 and Embodiment 2, the first control information indicating the measurement reference signal and the measurement reference signal are in the same time unit. In this embodiment, the first control information and the measurement reference signal may not be at the same time unit. Or the first control information is high layer configuration information. Only the measurement reference signal can occupy the time domain symbol where the downlink control channel domain is located.

Figure 6:
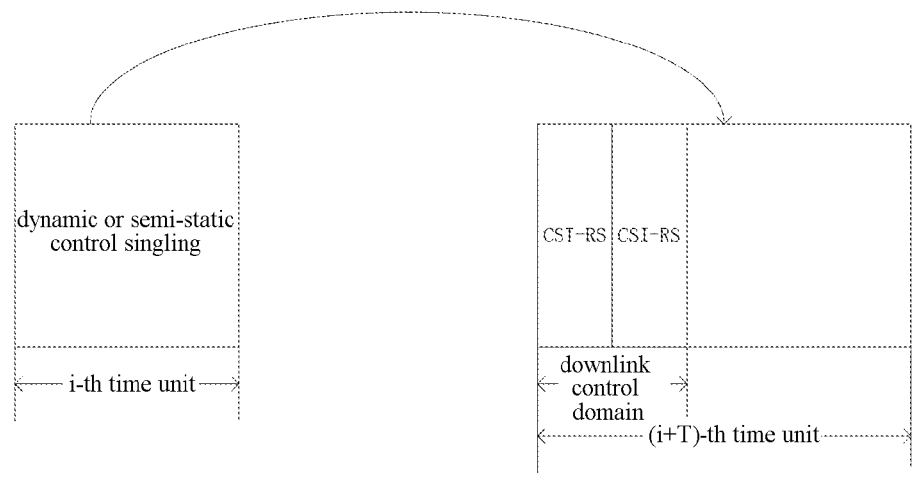
FIG. 6 is a diagram showing an example in which the first control information and the measurement reference signal are not in one time unit.

As shown in FIG. 6, in the i-th time unit, the base station sends configuration information of the measurement reference signal through the control signaling (which may be dynamic control signaling or semi-static control signaling), but the measurement reference signal is sent at the (i+T1)-th time unit, where T1 is an integer greater than 0, wherein the measurement reference signal can occupy a resource in a symbol of a downlink control domain in the (i+T1)-th time unit.

However, in this embodiment, the control signaling in the i-th time unit may indicate the configuration information of the measurement reference signal periodically transmitted, or the configuration information of the measurement reference signal periodically sent in a period of time, where the measurement reference signal may occupy resources in the time domain symbol of the downlink control domain.

Embodiment 4

In this embodiment, the demodulation reference signal of the downlink control domain can be used as the measurement reference signal, and the terminal reports the CSI condition according to the reception condition of the demodulation reference signal. The terminal and the base station set the number of demodulation reference signal ports of the control channel, and preferably in this case, there is a correspondence relationship between the demodulation reference signal port and the logical beam, for example, one-to-one correspondence relationship. However, this embodiment does not exclude other correspondences relationship.

Figure 7:
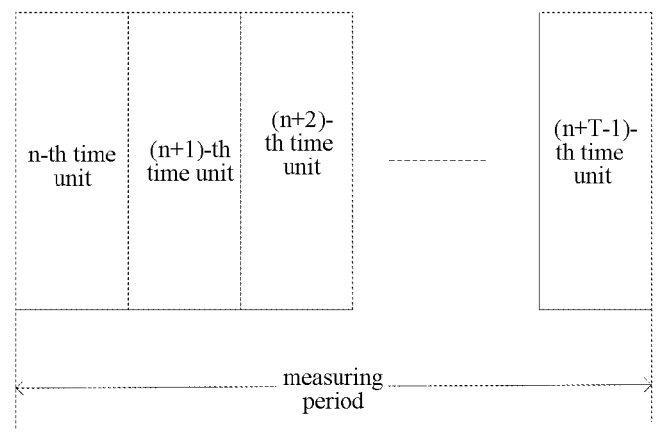
FIG. 7 is a diagram showing an example in which a measurement result is obtained taking a control channel demodulation reference signal as a measurement reference signal in one measurement period.

In a first implementation of the present embodiment, the base station transmits a demodulation reference signal port according to requirements, and the terminal measures the performance of each demodulation reference signal in each time unit of one measurement period. As shown in FIG. 7, if the number of the demodulation reference signal ports of the control channel is 16 (but the base station transmits one or more of the 16 ports in a time unit according to requirements), the terminal feeds back a matrix of 16×T, where the (i, j)-th element in the matrix represents the reception condition of the i-th demodulation reference signal port in the j-th time unit. Simply, each element is only 1 bit, 0 means that the reception quality of the i-th demodulation reference signal port in the j-th time unit is lower than a predetermined value, and 1 means that the reception quality of the i-th demodulation reference signal port in the j-th time unit exceeds the predetermined value. The base station considers the actual transmission condition of the demodulation reference signal port in each time unit, to obtain the link status to the terminal, so that the subsequent beam training or the data scheduling can be assisted with the feedback situation.

In a second implementation of this embodiment, the terminal feeds back the number of times received by each demodulation signal port in one measurement period. As shown in FIG. 7, the terminal feeds back a 16-dimensional vector value in one measurement period. The i-th value in the vector indicates the number of times of the i-th demodulation reference signal port exceeds the predetermined threshold in T time units.

However, in this embodiment, the terminal may further simplify the two feedback manners described above, for example, only feeding back a matrix or a vector of a predetermined dimension. The measurement result may also be a result obtained by combining the control channel demodulation reference signal and other reference signals.

Embodiment 5

In this embodiment, whether the measurement reference signal and the control channel can be transmitted in the same time domain symbol is configured. If the configuration is enabled, the measurement reference signal and the control channel can be sent in the same time domain symbol, if the configuration is not enabled, the measurement reference signal and the control channel may not be transmitted in the same time domain symbol.

This configuration can be Cell-Specific, such as through system message configuration, high layer configuration, or dynamic signaling configuration.

Embodiment 6

Figure 8:
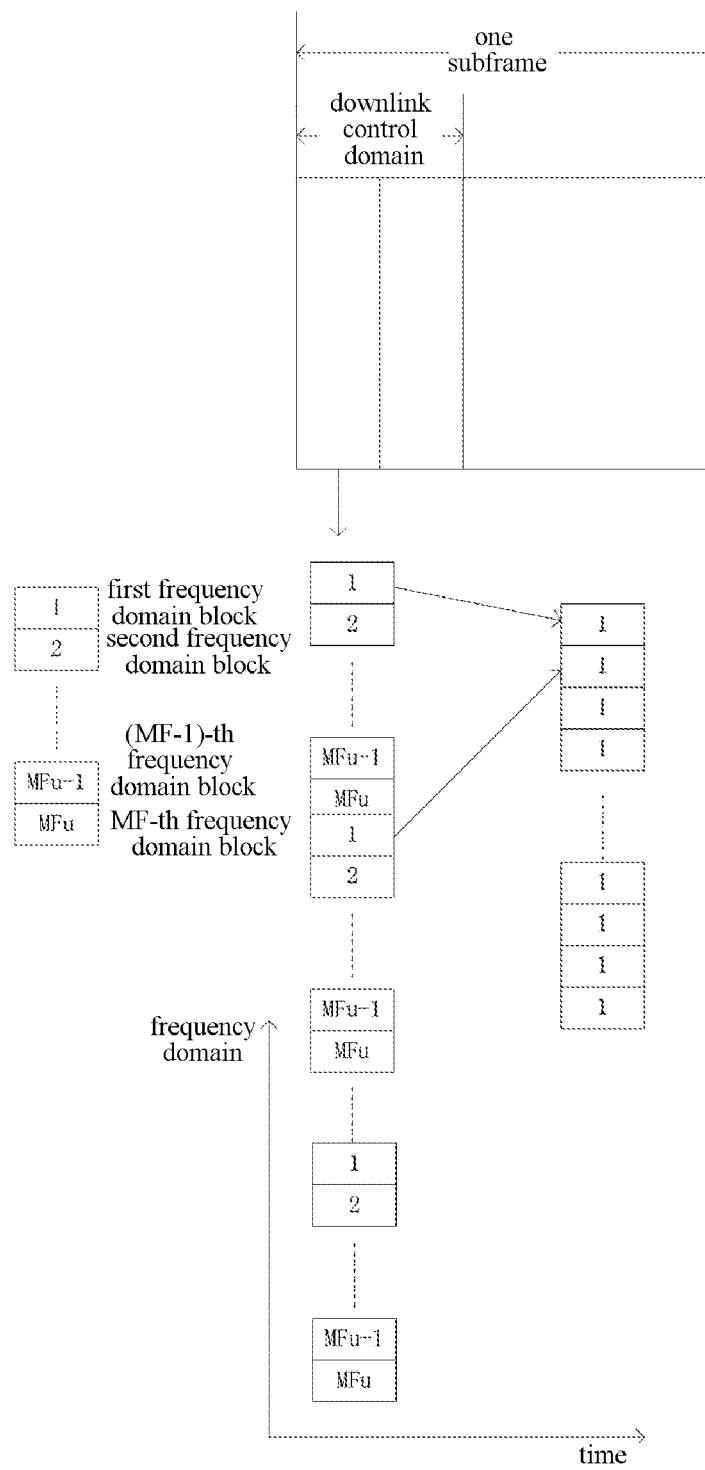
FIG. 8 is a diagram showing an example in which symbols in the control channel are polled in a combed manner to obtain different frequency domain blocks.

In this example, the symbols in the downlink control domain are divided into different frequency domain blocks in the comb-shaped structure. Preferably, one frequency domain block can be further divided into multiple resource groups, as shown in FIG. 8. One resource group is a minimum resource unit for control signaling mapping.

Preferably, in an implementation of this embodiment, a base station may only send a control channel in a frequency domain block group in one symbol, wherein the one frequency domain block group includes at least one frequency domain block. For example, the frequency domain block occupied by the control channel of one base station is obtained according to the base station ID, so that the frequency domain blocks occupied by different base stations may be different, thereby avoiding interference of the control channels between cells. Moreover, the frequency domain block resources occupied by one cell can be hopped.

Embodiment 7

In this embodiment, the measurement reference signal is configured to occupy a frequency domain resource in the first set of time domain symbols in which the control channel is located. The measurement reference signal is an uplink measurement reference signal, and the control channel is an uplink control channel, that is, the uplink control channel and the uplink measurement reference signal may occupy the same time domain symbol.

Figure 11A:
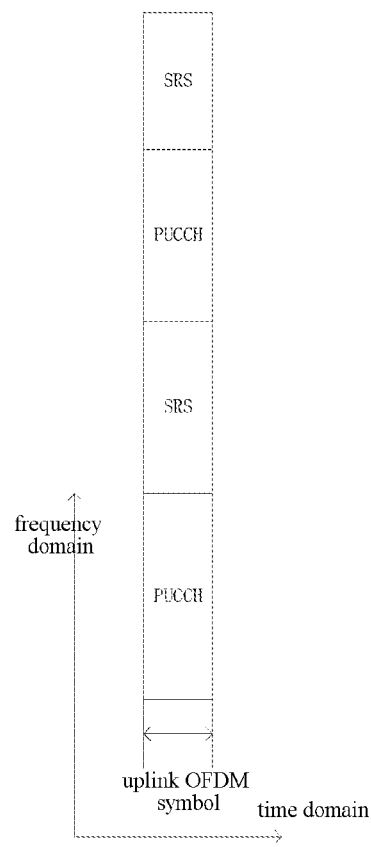
FIG. 11a is a diagram of showing an example in which an uplink control channel and an uplink measurement reference signal occupy the same time domain symbol in a frequency division multiplexing manner.

As shown in FIG. 11a, the SRS (that is, the uplink measurement reference signal, which may be other equivalent names, such as U-RS, which does not affect the patent scope) and the PUCCH (i.e., the uplink control channel) occupy different PRB resources for frequency division multiplexing.

Figure 11B:
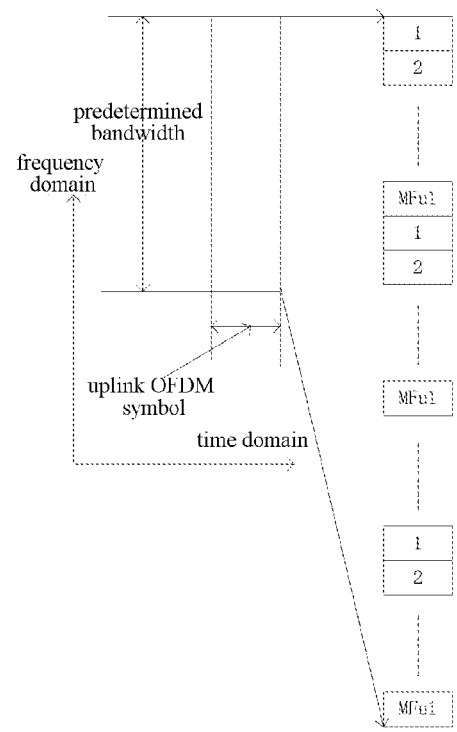
FIG. 11b is a diagram of showing an example in which an uplink control channel and an uplink measurement reference signal occupy the same time domain symbol in a combed frequency division multiplexing manner.

Alternatively, dividing the uplink symbol of the predetermined bandwidth into MFu1 frequency domain resources, and the SRS and the PUCCH may occupy different frequency domain resources, as shown in FIG. 11b.

Alternatively, the SRS and the PUCCH may occupy the same time-frequency resource, but the occupied code domain sequence is different, and the different codes are either pseudo-orthogonal or orthogonal.

In FIGS. 11a-11b, an uplink symbol is taken as an example, and this embodiment does not exclude the use of a similar method for a plurality of time domain symbols.

In the present disclosure, the different logical beams may be distinguished by one or more of the following resources: a beam resource, a time resource, a frequency domain resource, a sequence resource, a port resource, and a sector resource.

Embodiment 8

In this embodiment, the measurement reference signal occupies resources outside the predetermined frequency domain resource in the first set of time domain symbols in which the control channel is located, wherein the predetermined frequency domain resource is an area occupied by the control channel. The resources occupied by the predetermined bandwidth may be fixed, may be notified by a system message, may be configured by high layer signaling, or may be notified by dynamic control signaling.

Figure 12:
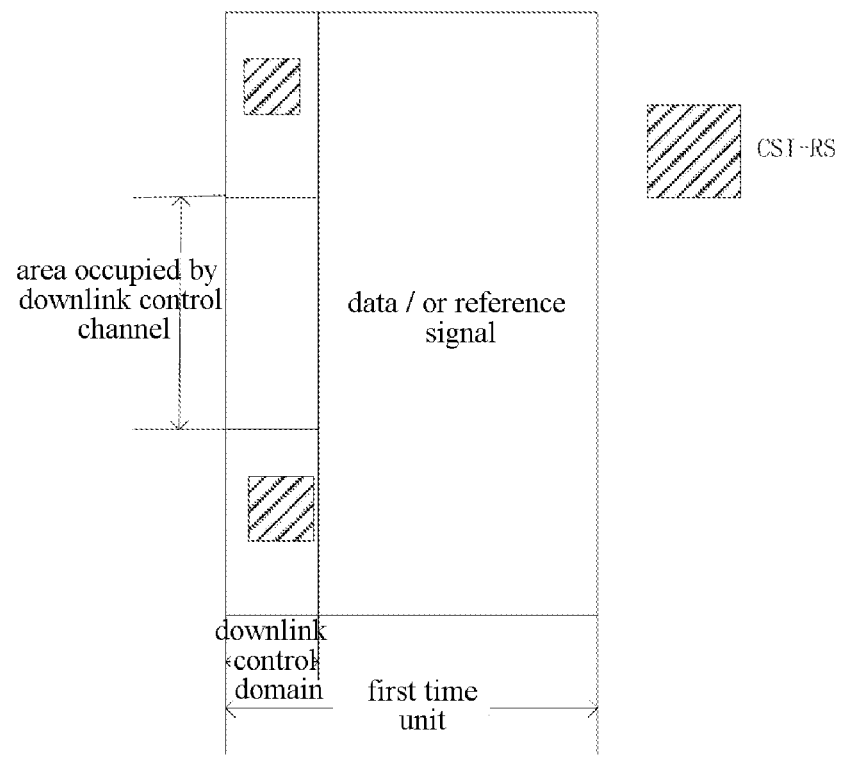
FIG. 12 is a diagram showing an example in which the measurement reference signal is transmitted over a resource outside the control channel region.

As shown in FIG. 12, the downlink control channel occupies an area of a predetermined bandwidth of the previous one or more time domain symbols, and the measurement reference signal may be sent in other areas. If the measurement reference signal is triggered to be sent on the time domain symbols in the time unit, the measurement reference signals are sent on resources outside the predetermined frequency domain, and the resource pattern occupied by the measurement reference signals outside the predetermined frequency domain is predetermined or notified by the trigger signaling.

Figure 10:
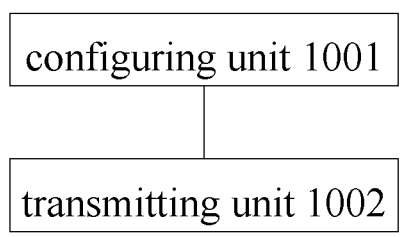
FIG. 10 is a block diagram of a device for transmitting a signal according to an embodiment of the present disclosure.

FIG. 10 is a block diagram of a device for transmitting a signal according to an embodiment of the present disclosure. As shown in FIG. 10, the apparatus includes a configuring unit 1001 and a transmitting unit 1002.

The configuring unit 1001 is configured to configure a measurement reference signal to occupy a frequency domain resource in a first set of time domain symbols where a control channel is located.

The transmitting unit 1002 is configured to transmit configuration information of the measurement reference signal or the control channel through control signaling; and/or transmit the control channel in a second set of time domain symbols where the measurement reference signal is located.

The set of time domain symbols includes M symbols, and M is a natural number; the measurement reference signal is a measurement reference signal port or a measurement reference signal resource, and the measurement reference signal resource includes at least one measurement reference signal port.

The measurement reference signal is transmitted in the set N time units.

In the embodiment of the present disclosure, the configuration information includes at least one of the following information:
an index of a time domain symbol occupied by the measurement reference signal in the first set of time domain symbols, an index of a frequency domain block of the measurement reference signal in the time domain symbol; information indicating whether to transmit the measurement reference signal; information indicating a transmission pattern of the measurement reference signal in the frequency domain block; information indicating whether to report channel state information (CSI) and to report the time-frequency resource where the CSI is located; configuration information of the first set of time domain symbols; and configuration information of the second set of time domain symbols.

One symbol includes MF frequency domain blocks, where MF is an integer greater than one.

In the embodiment of the present disclosure, at least one of the following information of the measurement reference signal is set with the receiving end: an index of a symbol occupied by the measurement reference signal in the first set of time domain symbols, an index of a frequency domain block of the measurement reference signal in the time domain symbol; information indicating whether to transmit the measurement reference signal; information indicating a transmission pattern of the measurement reference signal in the frequency domain block; and information indicating whether to report CSI and to report the time-frequency resource where the CSI is located.

In an embodiment of the present disclosure, in a time domain symbol, the control channel and the measurement reference signal are frequency division multiplexed.

In an embodiment of the present disclosure, the frequency division multiplexing satisfies at least one of the following features:
frequency division multiplexing of a combed structure is employed;
a number of the frequency domain blocks occupied by the control channel is greater than a number of the frequency domain blocks occupied by the measurement reference signal;
an index set of the frequency domain blocks that may be occupied by the measurement reference signal is a subset of an index set of the frequency domain blocks that may be occupied by the control channel;
the index set of the frequency domain blocks that may be occupied by the control channel includes all of the frequency domain blocks in the symbol; and
the index set of the frequency domain blocks occupied by the control channel and the index set of the frequency domain block occupied by the measurement reference signal are set with the receiving end.

In an embodiment of the present disclosure, the frequency domain block of the measurement reference signal in one symbol is larger than the frequency domain block corresponding to the control channel;

The frequency domain block of the measurement reference signal in one symbol includes a frequency domain block corresponding to NF control channels, where NF is an integer greater than 1.

In an embodiment of the present disclosure, the configuration information satisfies at least one of the following features:
one measurement reference signal port occupies a resource in NR symbols in the first set of time domain symbols, $1 \leq NR \leq M$;
one measurement reference signal resource occupies a resource in NR1 symbols in the first set of time domain symbols, $1 \leq NR1 \leq M$;
the control channel occupies MC symbols in the second set of time domain symbols in which the measurement reference signal is located, $1 \leq MC \leq MCT$, where the set of time domain symbols in which the measurement reference signal is located includes MCT time domain symbols;
the one measurement reference signal resource occupies a resource in the first set of time domain symbols, and does not occupy a resource outside the first set of time domain symbols;
the one measurement reference signal port occupies a part of the frequency domain block resource in the time domain symbol; and
the control signaling is transmitted in the control channel.

In a specific embodiment, NR is 1 and NR1 is 1.

In an embodiment of the present disclosure, one measurement reference signal resource occupies resources in the first set of time domain symbols and a resource outside the first set of time domain symbols; and
one measurement reference signal port occupies resources in the first set of time domain symbols and a resource outside the first set of time domain symbols.

In an embodiment of the present disclosure, the second set of time domain symbols satisfies at least one of the following features:

the second set of time domain symbols is at an end position of a downlink transmission domain of a first time unit;

x time domain symbols are between a start symbol of the second set of time domain symbols and a start position of the first time unit, where x is a natural number greater than 0; and the time domain symbols in the second set of time domain symbols are consecutive;

wherein the first time unit is a time unit where the second set of time domain symbols is located.

In an embodiment of the present disclosure, the first set of time domain symbols and/or the second set of time domain symbols appear in a set time unit, and the measurement reference signal cannot be transmitted on the first set of time domain symbols in an unset time unit, or the control channel cannot be transmitted on the second set of time domain symbols in an unset time unit.

The index of the set time unit is sent to the receiving end by signaling.

In an embodiment of the present disclosure, in the configuration information of the measurement reference signal, the index range of the time domain symbols occupied by the measurement reference signal includes one or more start time domain symbols of the second time unit;

wherein the second time unit is a time unit for transmitting the measurement reference signal.

In this embodiment of the present disclosure, the set of time domain symbols occupied by the control channel in the second set of time domain symbols is a subset of the second set of time domain symbols.

In an embodiment of the present disclosure, the control channel satisfies at least one of the following features:

a minimum mapping unit of the control channel is a comb-shaped frequency domain block in the one symbol; and a minimum mapping unit of the control channel is a subcarrier group in a comb-shaped frequency domain block in the one symbol, wherein one comb-shaped frequency domain block includes more than one subcarrier group.

In an embodiment of the present disclosure, one time domain symbol is one OFDM symbol;

the control channel is a downlink control channel;

the time unit is one subframe; and the control signaling is proprietary control signaling.

It will be understood by those skilled in the art that the implementation functions of the units in the apparatus for transmitting a signal shown in FIG. 10 can be understood by referring to the related description of the method for transmitting a signal. The functions of the respective units in the apparatus for transmitting a signal shown in FIG. 10 can be realized by a program running on the processor, or can be realized by a specific logic circuit.

An embodiment of the present disclosure further describes a storage medium storing a computer program therein, and the computer program is configured to execute the method for transmitting a signal of the foregoing embodiments.

Those skilled in the art will appreciate that embodiments of the present disclosure can be provided as a method, a system, or a computer program product. Accordingly, the present disclosure can take the form of a hardware embodiment, a software embodiment, or a combination of software and hardware embodiment. Moreover, the present disclosure can take the form of a computer program product embodied on one or more computer-usable storage media (including but not limited to a disk storage and an optical storage, etc.) including computer usable program codes.

The present disclosure has been described with reference to flowcharts or block diagrams of a method, an apparatus (system), and a computer program product according to embodiments of the present disclosure. It will be understood that each step in the flowchart or each block in the block diagram, and the combinations of the steps or blocks in the flowchart or block diagram may be implemented by computer program instructions. These computer program instructions can be provided to a processor of a general purpose computer, a special purpose computer, an embedded processor, or other programmable data processing device to produce a machine, such that instructions executed by a processor of a computer or other programmable data processing device may produce an apparatus for implementing the function specified in one or more steps in the flowchart or in one or more blocks in the block diagram.

The computer program instructions can also be stored in a computer readable memory that can direct a computer or other programmable data processing device to operate in a particular manner, such that the instructions stored in the computer readable memory produce an article of manufacture including an instruction apparatus. The apparatus implements the functions specified in one or more steps of the flowchart or in one or more blocks of the block diagram.

The computer program instructions can also be loaded onto a computer or other programmable data processing device such that a series of operational steps are performed on a computer or other programmable device to produce computer-implemented processing, such that the instructions executed on the computer or other programmable device provide steps for implementing the function specified in one or more steps in the flowchart or in one or more blocks in the block diagram.

The above is only the preferred embodiments of the present disclosure and is not intended to limit the scope of the present disclosure.

INDUSTRIAL APPLICABILITY

The present disclosure can solve the problem of waste of resources caused by signaling notification and reference signal time division transmission when the channel measurement signal is dynamically triggered. In addition, the present disclosure can increase the processing time of the terminal processing the measurement reference signal, so that the terminal can feed back the measurement result quickly, and even can report a measurement result in the current time unit. Moreover, the present disclosure can contemplate an application scenario: a resource pool of measurement reference signals is configured in a high layer. However, since the measurement reference signal is transmitted on demand, in this case, the measurement reference signal transmitted on demand in the resource pool of measurement reference signals is notified. Thus, the present disclosure can realize transmitting of the measurement reference signal on demand at the transmitting end while effectively improving the resource utilization of the triggered measurement reference signal.

What is claimed is:

1. A method for transmitting a measurement reference signal, comprising:

sending configuration information of a measurement reference signal by control signaling, wherein the configuration information satisfies the following features:

configuring the measurement reference signal to occupy a frequency domain resource in a first set of time domain symbols in which a downlink control channel is located; wherein the measurement reference signal is a Channel State Information-Reference Signal (CSI-RS);

sending the measurement reference signal according to the control signaling;

wherein the first set of time domain symbols comprise M time domain symbols, where M is a natural number; the measurement reference signal is in a measurement reference signal resource, and the measurement reference signal resource comprises at least one measurement reference signal port;

wherein in one time domain symbol of the first set of time domain symbols, an intersection between frequency resource blocks occupied by the measurement reference signal and frequency resource blocks occupied by the downlink control channel is empty, and one resource block comprises consecutive subcarriers;

wherein the first set of time domain symbols in which the downlink control channel is located are semi-statically configured.

2. The method according to claim 1, wherein the configuration information comprises at least one of:

one or more indexes of one or more frequency domain blocks of the measurement reference signal in one time domain symbol, information indicating whether to report channel state information (CSI), or information indicating time-frequency resource where the CSI is located; wherein one symbol comprises MF frequency domain blocks, where MF is an integer greater than one.

3. The method according to claim 1, wherein in one time domain symbol, the control channel and the measurement reference signal are frequency division multiplexed.

4. The method according to claim 1, wherein in a time domain symbol, frequency division multiplexing of the control channel and the measurement reference signal comprises that the measurement reference signal occupies a resource block outside preset frequency domain resource blocks in the first set of time domain symbols where the control channel is located;

wherein the preset frequency domain resource blocks are areas including the control channel, and comprise one or more of the resource blocks, wherein the preset frequency domain resource blocks satisfy at least one of the following features:

the preset frequency domain resource blocks are fixed;

the preset frequency domain resource blocks are notified by a system message;

the preset frequency domain resource blocks are configured by high layer signaling;

the preset frequency domain resource blocks are notified by dynamic control signaling.

5. The method according to claim 1, wherein the method has at least one of the following features:

in a time domain symbol, a beam for the measurement reference signal and a beam for the control channel are the same;

if beams for two signals and/or channels are different, the two signals and/or channels are time division multiplexed;

beams for two signals and/or channels in a time domain symbol are the same;

the index of time domain symbols for detecting a downlink control channel in a start time domain symbol set in a time unit is determined according to UE-specific control signaling, wherein the start time domain symbol set comprises time domain symbols with index number 0 to index number B in the time unit, wherein B is a non-negative integer which is smaller than or equal to 3;

the first set of time domain symbols are determined according to a first high layer control signaling;

the measurement reference signal occupies any number of fourteen time domain symbols comprised in the second time unit; time domain symbols for detecting the downlink control channel in individual time units are determined according to a second high layer control signaling;

the first set of time domain symbols comprise M symbols in the second time unit;

the first set of time domain symbols comprise the time domain symbols of the start time domain symbol set in the second time unit.

6. A device for transmitting a measurement reference signal, comprising:

a processor;

a memory for storing instructions executable by the processor;

wherein the processor is configured to perform the method according to claim 1.

7. A method for receiving a measurement reference signal, comprising:

receiving control signaling, wherein the control signaling comprises configuration information of a measurement reference signal, and the configuration information satisfies the following features: configuring the measurement reference signal to occupy a frequency domain resource in a first set of time domain symbols in which a downlink control channel is located; wherein the measurement reference signal is a Channel State Information-Reference Signal (CSI-RS); and receiving the measurement reference signal according to the control signaling;

wherein the first set of time domain symbols comprise M symbols, where M is a natural number; the measurement reference signal is in a measurement reference signal resource, and the measurement reference signal resource comprises at least one measurement reference signal port;

wherein in one time domain symbol of the first set of time domain symbols, an intersection between frequency resource blocks occupied by the measurement reference signal and frequency resource blocks occupied by the downlink control channel is empty, and one resource block comprises consecutive subcarriers;

wherein the first set of time domain symbols in which the downlink control channel are semi-statically configured.

8. The method according to claim 7, wherein the configuration information comprises at least one of: an index of a frequency domain block of the measurement reference signal in one time domain symbol, information indicating whether to report channel state information (CSI), or information indicating time-frequency resource where the CSI is located; wherein one time domain symbol comprises MF frequency domain blocks, where MF is an integer greater than one.

9. The method according to claim 7, wherein in a time domain symbol, the control channel and the measurement reference signal are frequency division multiplexed;

wherein an intersection between resource blocks occupied by the measurement reference signal and the control channel is empty, and one resource block comprises consecutive subcarriers.

10. The method according to claim 7, wherein in a time domain symbol, frequency division multiplexing of the control channel and the measurement reference signal comprises that the measurement reference signal occupies resource blocks outside preset frequency domain resource blocks in the first set of time domain symbols where the control channel is located;
wherein the preset frequency domain resource blocks are areas including the control channel, and comprise one or more of the resource blocks; wherein the preset frequency domain resource blocks satisfy at least one of the following features:
the preset frequency domain resource blocks are fixed;
the preset frequency domain resource blocks are notified by a system message;
the preset frequency domain resource blocks are configured by high layer signaling; or
the preset frequency domain resource block is notified by dynamic control signaling.

11. The method according to claim 7, wherein the method has at least one of the following features:
in a time domain symbol, a beam for the measurement reference signal and a beam for the control channel are the same;
if beams for two signals and/or channels are different, the two signals and/or channels are time division multiplexed;
beams for two signals and/or channels in a time domain symbol are the same;
the index of time domain symbols for detecting a downlink control channel in a start time domain symbol set in a time unit is determined according to UE-specific control signaling, wherein the start time domain symbol set comprises time domain symbols with index number 0 to index number B in the time unit, wherein B is a non-negative integer which is smaller than or equal to 3;
time domain symbols for detecting the downlink control channel in individual time units are determined according to a first high layer control signaling;
the measurement reference signal occupies any symbol of fourteen time domain symbols comprised in the second time unit;
the first set of time domain symbols comprise M symbols in the second time unit;
the first set of time domain symbols comprise the time domain symbols of the start time domain symbol set in the second time unit;
the first set of time domain symbols are determined according to a second high layer control signaling.

12. A device for receiving a measurement reference signal, comprising:
a processor;
a memory for storing instructions executable by the processor;
wherein the processor is configured to perform the method according to claim 7.

13. A method for detecting a downlink control channel, comprising at least one of:
detecting a downlink control channel in a second set of time domain symbols which are occupied by a measurement reference signal; or detecting a downlink control channel in a second set of time domain symbols, and determining indexes of time domain symbols including the measurement reference signal in the second set of time domain symbols according to a first control information;
wherein the second set of time domain symbols comprises M time domain symbols, and M is a natural number;
wherein the measurement reference signal is a Channel State Information-Reference Signal (CSI-RS);
wherein in one time domain symbol of the second set of time domain symbols, an intersection between frequency resource blocks occupied by the measurement reference signal and frequency resource blocks occupied by the downlink control channel is empty, and one resource block comprises consecutive subcarriers.

14. The method according to claim 13, wherein the second set of time domain symbols satisfy at least one of the following features:
there are x time domain symbols between a start symbol of the second set of time domain symbols and a start position of a time unit including the second set, where x is a natural number greater than or equal to 0;
there are y time domain symbols between an end symbol of the second set of time domain symbols and an end position of a time unit including the second set, where y is a natural number greater than 0;
the second set of time domain symbols comprises M time domain symbols in a time unit;
the time domain symbols in the second set are consecutive;
information about the second set of time domain symbols is obtained according to UE-Specific control signaling;
information about the second set of time domain symbols is obtained according to common control signaling;
the second set of time domain symbols exist periodically;
on a time symbol in the second set of time domain symbols which comprises the downlink control channel and the measurement reference signal, an intersection between a resource block occupied by the measurement reference signal and a resource block occupied by the downlink control channel is empty; or
on a time symbol in the second set of time domain symbols which comprises the downlink control channel and the measurement reference signal, the measurement reference signal occupies a frequency domain resource block outside preset frequency domain resource blocks, wherein the preset frequency domain resource blocks are areas including the control channel, and comprise one or more of the resource blocks and the preset frequency domain resource blocks satisfy at least one of the following features: the preset frequency domain resource blocks are fixed; the preset frequency domain resource blocks are notified by a system message; the preset frequency domain resource blocks are configured by high layer signaling; the preset frequency domain resource blocks are notified by dynamic control signaling.

15. The method according to claim 13, wherein determining indexes of time domain symbols including the measurement reference signal in the second set of time domain symbols according to first control information, comprises at least one of:
determining rate match information of a data channel according to the first control information;
the first control information is common control information;

not receiving the measurement reference signal on a time symbol in the second set of time domain symbols which does not includes the measurement reference signal;

receiving the measurement reference signal on a time symbol in the second set of time domain symbols which includes the measurement reference signal;

wherein the rate match information comprises at least one of the following information: the data channel does not occupy the time domain symbol occupied by the measurement reference signal; on a time domain symbol where the measurement reference signal and the downlink control channel are located, the data channel does not occupy a resource block occupied by the measurement reference signal and does not occupy a resource block occupied by the downlink control channel; on a time domain symbol where the measurement reference signal is located, the data channel does not occupy a resource block occupied by the measurement reference signal.

16. The method according to claim 13, further comprising:

receiving second signaling information, wherein the second signaling information is used to notify indexes of time domain symbols which the data channel is not allowed to occupy.

17. The method according to claim 13, wherein the method is characterized in at least one of:

the second set of time domain symbols comprise all time domain symbols in a downlink transmission domain in one or more time units;

the downlink control channel is detected in even index time domain symbols in the second set of time domain symbols;

the downlink control channel is detected in time domain symbols of a subset of the second set of time domain symbols;

information of indexes of time domain symbols where the downlink control channel is detected in the second set of time domain symbols is according to third signaling information;

one downlink control information occupies one time domain symbol in the second set of time domain symbols;

the second set of time domain symbols comprises more than one detection occasion for the downlink control channel;

a common downlink control channel is detected in the second set of time domain symbols.

18. The method according to claim 13, wherein the method has at least one of the following features:

the downlink control channel is detected in at least one of the downlink control domain and the second set of time domain symbols;

a beam for the downlink control channel in the downlink control domain and a beam for the downlink control channel in the second set of time domain symbols are different;

a minimum mapping resource unit for the control channel in the downlink control domain and a minimum resource mapping unit for the control channel in the second set of time domain symbols are the same;

each time domain symbol in the second set of time domain symbols is a detection occasion of the control channel;

a time domain symbol for detecting the downlink control channel is determined according to a logic beam index, wherein there is a mapping relationship between the logic beam index and the time domain symbol;

wherein a gap between a start position of the second set of time domain symbols and a start position of the time unit is greater than zero, and a gap between a start position of the downlink control domain and the start position of the time unit is equal to zero.

19. A device for detecting a downlink control channel, comprising:

a processor; and a memory for storing instructions executable by the processor;

wherein the processor is configured to perform the method according to claim 13.

* * * * *

UNITED STATES PATENT AND TRADEMARK OFFICE
CERTIFICATE OF CORRECTION

PATENT NO. : 11,277,759 B2
APPLICATION NO. : 16/338342
DATED : March 15, 2022
INVENTOR(S) : Shujuan Zhang et al.

Page 1 of 1

It is certified that error appears in the above-identified patent and that said Letters Patent is hereby corrected as shown below:

In the Claims

Column 28, Line 54, after "downlink control channel", insert --is located--.

Signed and Sealed this
Twenty-eighth Day of February, 2023

Katherine Kelly Vidal
*Director of the United States Patent and Trademark Office*